US012565002B2

(12) United States Patent
De La Torre Ugarte Del Castillo et al.

(10) Patent No.: US 12,565,002 B2
(45) Date of Patent: Mar. 3, 2026

(54) ADDITIVE MANUFACTURE SYSTEM

(71) Applicant: Kongsberg Ferrotech AS, Kongsberg (NO)

(72) Inventors: Luis De La Torre Ugarte Del Castillo, Kongsberg (NO); Torgeir Bræin, Kongsberg (NO)

(73) Assignee: Kongsberg Ferrotech AS, Kongsberg (NO)

( * ) Notice: Subject to any disclaimer, the term of this patent is extended or adjusted under 35 U.S.C. 154(b) by 486 days.

(21) Appl. No.: 16/615,675

(22) PCT Filed: May 24, 2018

(86) PCT No.: PCT/NO2018/050139
§ 371 (c)(1),
(2) Date: Nov. 21, 2019

(87) PCT Pub. No.: WO2018/217101
PCT Pub. Date: Nov. 29, 2018

(65) Prior Publication Data
US 2020/0086571 A1 Mar. 19, 2020

(30) Foreign Application Priority Data

May 24, 2017 (GB) ..................................... 1708326
Jul. 7, 2017 (GB) ..................................... 1711011
(Continued)

(51) Int. Cl.
*B29C 64/25* (2017.01)
*B29C 64/371* (2017.01)
(Continued)

(52) U.S. Cl.
CPC ............ *B29C 64/25* (2017.08); *B29C 64/371* (2017.08); *B29C 64/393* (2017.08); *B33Y 10/00* (2014.12);
(Continued)

(58) Field of Classification Search
CPC ....... B29C 64/25; B29C 64/393; B33Y 10/00; B33Y 30/00; B33Y 50/02
See application file for complete search history.

(56) References Cited

U.S. PATENT DOCUMENTS 3,688,069 A 8/1972 Kazlauskas
4,171,175 A 10/1979 Nobileau et al.
(Continued)

FOREIGN PATENT DOCUMENTS

CN 106738911 A 5/2017
EP 2006045 A2 12/2008
(Continued)

OTHER PUBLICATIONS

Wang et al., Investigation of the underwater laser directed energy deposition technique for the on-site repair of HSLA-100 steel with excellent performance, Additive Manufacturing vol. 39, Mar. 2021, 101884 (Year: 2021).*
(Continued)

*Primary Examiner* — Yung-Sheng M Tsui
(74) *Attorney, Agent, or Firm* — Dority & Manning, P.A.

(57) ABSTRACT

A system (10) is provided for performing an operation on a subsea body (100), the system (10) comprises: a housing (20) configured to establish a sealed chamber around a section of the body (100); an environmental system configured to monitor and/or control an environment within the sealed chamber; and an operational tool (40) mounted to a positioning system (30) within the housing (20), wherein the operational tool (40) is configured to perform an additive
(Continued)

manufacture operation on the body (100) within the sealed chamber. Also provided is a system (201) for performing an operation on an interior surface of a tubular body (200).

9 Claims, 12 Drawing Sheets

(30)        Foreign Application Priority Data

| | | | |
|---|---|---|---|
| Jul. 21, 2017 | (GB) | ...................................... | 1711807 |
| Aug. 25, 2017 | (GB) | ...................................... | 1713737 |

(51) Int. Cl.

| | |
|---|---|
| *B29C 64/393* | (2017.01) |
| *B33Y 10/00* | (2015.01) |
| *B33Y 30/00* | (2015.01) |
| *B33Y 40/00* | (2020.01) |
| *B33Y 40/10* | (2020.01) |
| *B33Y 40/20* | (2020.01) |
| *B33Y 50/02* | (2015.01) |
| *E21B 41/00* | (2006.01) |

(52) U.S. Cl.
CPC .............. *B33Y 30/00* (2014.12); *B33Y 40/00* (2014.12); *B33Y 40/10* (2020.01); *B33Y 40/20* (2020.01); *B33Y 50/02* (2014.12); *E21B 41/0007* (2013.01)

(56)            References Cited

U.S. PATENT DOCUMENTS

| | | | |
|---|---|---|---|
| 4,258,794 | A | 3/1981 | Sizer et al. |
| 8,113,242 | B1 | 2/2012 | Bennett |
| 9,016,324 | B2 | 4/2015 | Niccolls et al. |
| 2016/0031155 | A1 | 2/2016 | Tyler |
| 2016/0305712 | A1 | 10/2016 | Harris |

FOREIGN PATENT DOCUMENTS

| | | | |
|---|---|---|---|
| EP | 2558287 | A0 | 10/2011 |
| EP | 2600051 | A1 | 6/2013 |
| GB | 1234087 | | 6/1971 |
| GB | 2345016 | A | 6/2000 |
| JP | S9151694 | A | 8/1984 |
| RU | 2100686 | C1 | 12/1997 |
| WO | 2004099661 | A1 | 11/2004 |
| WO | 2011127884 | A1 | 10/2011 |
| WO | 2012013847 | A1 | 2/2012 |
| WO | 2016020690 | A1 | 2/2016 |
| WO | 2016092282 | A1 | 6/2016 |
| WO | 2018016969 | A1 | 1/2018 |
| WO | 2018016970 | A1 | 1/2018 |

OTHER PUBLICATIONS

Liu et al., In Situ Formation of Laser-Cladded Layer on Thin-Walled Tube of Aluminum Alloy in Underwater Environment, Materials (Basel) Aug. 21, 2021;14(16):4729. doi: 10.3390/ma14164729 (Year: 2021).*

Sun et al., Underwater Laser Welding/Cladding for High-performance Repair of Marine Metal Materials: A Review, Metal Materials: A Review. Chin. J. Mech. Eng. 35, 5 (2022). https://doi.org/10.1186/s10033-021-00674-0 (Year: 2022).*

UKIPO Search Report dated Sep. 21, 2018, for corresponding Application No. GB1713737.3; consisting of 2-pages.

UKIPO Search Report dated Oct. 31, 2017, for corresponding Application No. GB1708326.2; consisting of 5-pages.

International Search Report and Written Opinion dated Aug. 3, 2018 for corresponding International Application Number PCT/NO2018/050139, filed on May 24, 2018; consisting of 11-pages.

Russian Office Action dated Dec. 3, 2021, for corresponding Russian Application No. 2019142629/12; consisting of 8-pages.

* cited by examiner

Fig. 2

Fig. 14A
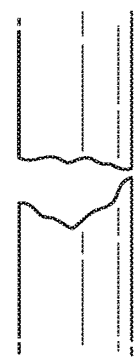
Fig. 14B
Fig. 14C
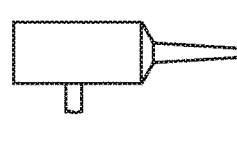
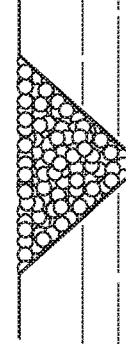
Fig. 14D
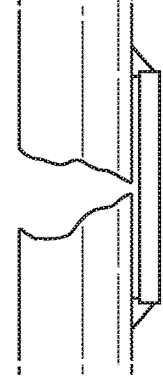

ADDITIVE MANUFACTURE SYSTEM

CROSS-REFERENCE TO RELATED APPLICATIONS

This application is a Submission under 35 U.S.C. § 371 for U.S. National Stage Patent Application of, and claims priority to, International Application Number PCT/NO2018/050139 entitled ADDITIVE MANUFACTURE SYSTEM, filed May 24, 2018, which is related to and claims priority to Great Britain Patent Number 1708326.2, filed May 24, 2017, Great Britain patent Number 1711011.5, filed Jul. 7, 2017, Great Britain Patent Number 1711807.6, filed Jul. 21, 2017, and Great Britain Patent Number 1713737.3, filed Aug. 25, 2017, the entirety of all of which are incorporated herein by reference.

The present invention relates to a system and method for performing additive manufacture techniques in a controlled environment, particularly for use in subsea environments.

Additive manufacture, sometimes known as 3D printing, refers to the manufacture of three dimensional structures by sequentially depositing layer-upon-layer of material. ISO/ASTM52900-15 defines seven categories of additive manufacture processes within its meaning: binder jetting, directed energy deposition, material extrusion, material jetting, powder bed fusion, sheet lamination and vat photopolymerization.

Additive manufacturing techniques permit unique components to be relatively quickly and easily manufactured. This is particularly advantageous for repairing damaged structures because the new component can be manufactured to, for example, engage with a damaged surface of an existing structure.

Typically, components produced by additive manufacture are formed off site and then transported to the repair location where they are installed. This is because additive manufacture machinery has previously not been capable of operating in exposed environments, such as those found in subsea conditions.

The present invention provides a system for performing an operation on a body, the system comprising: a housing configured to establish a sealed chamber around a section of the body; an environmental system configured to monitor and/or control an environment within the sealed chamber; and an operational tool mounted within the housing, wherein the operational tool is configured to perform an additive manufacture operation on the body within the sealed chamber.

In accordance with the described system, a controlled environment is established around a body to be repaired and then, within this controlled environment, the additive manufacturing can take place. Thus, the conditions within the sealed chamber can be carefully regulated to ensure the optimal conditions for performing additive manufacture. The described system thus permits an additive manufacture operation to be performed in situ. That is to say, the additive manufacture operation may be performed on the spot.

The body is preferably a subsea body. However, in some embodiments, the system may be for use on a body that is not underwater. For example, the system may be for use on body which may be located in a splash zone. In other examples, the system may be for use on topside structures of an offshore platform, and more generally anywhere on land, as part of infrastructure (piles, masts, pipelines . . . ), industrial structures (tanks, reservoirs, chimneys, pipes etc. . . . ) or other structures.

For example, the environmental system may be configured to drain a fluid, e.g. sea water, from the sealed chamber and/or to fill the sealed chamber with another fluid, such as a gas. Any suitable gas may be used, as required by the relevant additive manufacturing technique used. For example, in some embodiments, the gas may be air or dried air. In other embodiments an inert gas may be used. This may be particularly advantageous where arc deposition, for example, is used to prevent oxidation of the deposited material.

The environmental system may comprise a pump for draining the fluid from the sealed chamber. The environmental system may comprise a source of fluid. For example, the source of fluid may comprise a pressurised container storing a gas. Alternatively, the environmental system may comprise a connection to a remote source of fluid, for example at surface level.

The environmental system may be configured to regulate a temperature and/or pressure within the sealed chamber. For example, the environmental system may comprise one or more pressure and/or temperature sensors located within the housing. The environmental system may be configured to adjust a flow rate of gas through the sealed chamber to regulate the temperature. For example, the sealed chamber may comprise a controllable valve on an inlet into chamber and a controllable valve on an outlet to the chamber.

The body is preferably an elongate body, and more preferably a tubular elongate body, such as a riser, an umbilical, a pipeline, etc. Further exemplary elongate bodies may include platform legs, topside pipes, scaffolding, towers and the like.

The system may further comprise a positioning system for positioning the operational tool with respect to the body. The positioning system may be configured to move the operational tool freely in any direction and/or orientation, e.g. by a robotic arm or the like, or may be restricted to movement along predetermined degrees of freedom, e.g. by tracks or guides or the like.

In one embodiment, the positioning system may be configured to permit linear translation of the tool with respect to the body. Where the body is an elongate body, the linear translation may be axial translation with respect to the elongate body. The positioning system may be configured to permit orbital motion of the tool around the body. That is to say, the tool is moved along a circular or elliptical path around the body. Where the body is an elongate body, the orbital motion is preferably around the axis of the elongate body.

In one arrangement, the positioning system may comprise an elongate guide extending adjacent the body for controlling the linear translation and a circular or elliptical guide extending around the body for controlling the orbital translation.

The circular or elliptical guide may comprise a first support structure having a notch for receiving the body, where the operational tool is mounted to a second support structure having a notch for receiving the body, where the second support structure is rotatable with respect to the first support structure.

The circular or elliptical guide may comprise two guide portions that engage one another around the body to form the circular or elliptical guide. When engaged, the operational tool may be arranged to move from one guide portion to the other guide portion to orbit the body.

In one configuration, the circular or elliptical guide may be configured to move linearly along the elongate guide and the operational tool may be configured to move linearly along the circular or elliptical guide. In another configuration, the elongate guide may be configured to move in an orbital path around the circular or elliptical guide and the operational tool may be configured to move linearly along the elongate guide.

The positioning system is preferably configured to permit the operational tool to reach any orbital position around the body. That is to say, it can be positioned at any angle from 0° through to 360°. In one embodiment, the operational tool may be capable of rotating completely around the body.

The system may be configured to move the operational tool and/or the position system in a direction towards or away from the body so as to engage or disengage the positioning system from the body.

The positioning system may be mounted inside the housing and/or may form part of the housing.

The housing may be configured to form the sealed chamber between the body and the housing. The housing may comprise at least two segments configured to engage one another to form the sealed chamber. The one or more of the segments of the housing may comprise seals along their edges to form a substantially gas-tight seal when the segments engage one another.

The housing is preferably substantially tubular.

The additive manufacture operation may comprise depositing a plurality of layers of a material onto the body. The additive manufacture operation preferably uses one of directed energy deposition additive manufacture, material extrusion additive manufacture and material jetting additive manufacture. Most preferably, the additive manufacture uses material jetting additive manufacture, and particularly cold spray additive manufacture or thermal spray additive manufacture. The material may be an elastomeric material, a polymeric material, a metal, concrete or other material. The material may be deposited in liquid form, powder form, or sheet material form. The material may be deposited by arc deposition.

The system may be configured to perform an additive manufacture repair operation, e.g. to repair, create or recreate a portion of the body flanges, or to fill a pitted surface or hole. The system may also or alternatively be used to repair, create or recreate a protective coating material surrounding the body.

The system may comprise a vehicle for positioning the housing at a desired location on the body. In one embodiment, vehicle may be configured to translate along the body to reach the desired location. For example, in the case of an elongate body, the vehicle may be a crawler-type vehicle. In other embodiments, the vehicle may be a subsea vehicle, such as a submarine or an unmanned and/or autonomous underwater vehicle.

Viewed from a second aspect, the present invention provides a method of performing an operation on a body, the method comprising: forming a housing around a section of a body to establish a sealed chamber between the housing and the elongate body; establishing a controlled environment within the sealed chamber; and performing an additive manufacture operation on the body within the sealed chamber.

The body is preferably an elongate body, and more preferably a tubular elongate body, such as a riser, an umbilical, a pipeline, etc.

The body is preferably a subsea body. However, in some embodiments, the body may not be underwater. For example, the body may be located in a splash zone. In other examples, the body may be part of a topside structure of an offshore platform. In yet other examples, the body may be part of any land structure or infrastructure.

Establishing the controlled environment may comprise draining a fluid from the sealed chamber and/or filling the sealed chamber with another fluid, such as a gas. Any suitable fluid may be used, as required by the relevant additive manufacturing technique used. For example, in some embodiments, the fluid may be air or dried air. In other embodiments an inert gas may be used.

The fluid may be supplied from a source of the fluid. For example, the source of fluid may comprise a subsea pressurised container storing the gas. Alternatively, the fluid may be supplied from a remote source of fluid, for example at surface level.

The method may comprise regulating a temperature and/or pressure within the sealed chamber. The temperature may be regulated by adjusting a flow rate of fluid through the sealed chamber. The temperature and/or pressure may be regulated by controlling one or both of valve on an inlet into chamber and a valve on an outlet to the chamber.

Performing the operation may comprise positioning an operational tool at a desired location with respect to the body. Performing the operation may comprise moving the operational tool along a predetermined trajectory around the body.

The method may comprise calculating the trajectory. Calculating the trajectory may comprise comparing a computer model of a structure to be manufactured to a surface of the body, and may comprise calculating where material must be added to manufacture the modelled structure.

Positioning and/or moving the operational tool may comprise a combination of linear translation of the tool with respect to the body and orbital motion of the tool around the body.

Performing the operation may comprise moving the operational tool along an oscillating orbital path. That is to say, such as the operational tool does not continuously orbit the body. Hence, any cables connecting the operational tool to static structures are not wound around the body.

The method may comprise moving the operational tool and/or a position system in a direction towards the body so as to engage the body and/or in a direction away from the body so as to disengage the body.

The additive manufacture operation may comprise depositing a plurality of layers of a material onto the body. The additive manufacture operation preferably uses one of directed energy deposition additive manufacture, material extrusion additive manufacture and material jetting additive manufacture. Most preferably, the additive manufacture uses material jetting additive manufacture, and particularly cold spray additive manufacture or thermal spray additive manufacture The material may be a polymer material, a metal, concrete or other material. The material may be deposited in liquid form, powder form, or sheet material form. The material may be deposited by arc deposition.

The operation may be an additive manufacture repair operation, e.g. to repair, create or recreate a portion of the body flanges, or to fill a pitted surface or hole and/or to repair, create or recreate a protective coating material surrounding the body.

The method may comprise positioning the housing at a desired location on the body. The positioning may be performed by a vehicle. The vehicle may be translate along the body to reach the desired location, or the vehicle may be a subsea vehicle, such as a submarine or an unmanned and/or autonomous underwater vehicle.

Viewed from a third aspect, the present invention provides a system for performing an operation on an interior surface of a tubular body, the system comprising: an operational tool configured to perform an additive manufacture operation on a portion of the interior surface of the tubular body; a carrier supporting the operational tool and configured to be movable within the tubular body; a sealing assembly configured to establish a sealed chamber around the operational tool and the portion of the interior surface of the tubular body; an environmental system configured to monitor and/or control an environment within the sealed chamber.

In accordance with the described system, a controlled environment is established within a tubular body and then, within this controlled environment, the additive manufacturing can take place. Thus, the conditions within the sealed chamber can be carefully regulated to ensure the optimal conditions for performing additive manufacture. This advantageously allows modifications and repairs to be performed within the tubular body without the need for removal of the relevant section of tubular body, which would otherwise be costly and time consuming. For example, in the case of underwater risers, the entire pipeline suspends from surface level and removal of a segment of riser is a complex process. In other examples, subsurface pipelines may require significant excavation in order to access pipelines to perform repairs, maintenance or upgrades.

In various embodiments, the described system may be capable of performing repairs on the tubular body. Such repairs may include repair of a leak in a wall of the tubular body.

In some embodiments, the operations may include reinforcement of a weakness or thinning of the wall of the tubular body due to corrosion, abrasion or the like. In yet further embodiments, the repairs may include repair of a protective coating applied to the inner walls of the elongate body.

In some embodiments, the described system may be capable of installing new structures within the elongate body. For example, the system may be capable of constructing flanges, nipples, mounts for other components and the like. In some embodiments, the system may be capable of constructing more complex components, such as valve members or the like. In the case of valves, the system may be coupled with a system operating externally of the tubular body to construct parts of the component external of the tubular body.

The sealing assembly may be mounted to the carrier. For example, the sealing assembly comprises a first seal axially ahead of the operational tool and a second seal axially behind the operational tool.

The first and second seals may each configured to engage with a housing of the carrier and with the inner surface of the tubular body to establish the sealed chamber. That is to say, the sealed chamber is established between the first seal, the second seal, the housing, the carrier and the surface of the tubular body itself.

Whilst the sealing assembly may use seals mounted to the carrier, it will be appreciated that sealing may be achieved using separate sealing members. For example, a seal may be positioned ahead of the carrier and behind the carrier, but separate from the carrier. In further embodiments, the sealed chamber may be established along the entire length of elongate body. For example, both ends of the tubular body may be sealed to establish the sealed chamber, or where only one end is open then only that end may be sealed.

The carrier may be configured to engage with an interior surface of the tubular body to prevent axial movement of the carrier with respect to the tubular body whilst the operational tool is performing the additive manufacturing operation. For example, the carrier may comprise a movement mechanism, such as wheels or treads, that can be locked when the carrier reaches a desired location. Alternatively, where the sealing assembly is mounted to the carrier, the carrier may engage the interior surface of the tubular body by engaging the sealing assembly. Thus, establishing the sealed chamber also locks the carrier in position within the tubular body.

The environmental system is preferably configured to drain a fluid from the sealed chamber. The fluid may comprise any fluid present in the tubular body. For example, the fluid may comprise a produced hydrocarbon fluid such as hydrocarbon liquids (e.g. oils) or hydrocarbon gases. These are particularly important to remove as some additive manufacture techniques could provide an ignition source. In other embodiments, the fluid may comprise water. For example, the environmental system may be configured to fill the sealed chamber with water to force out any remaining hydrocarbon gas, or if there has been a leak in a subsea tubular body then the body may have filled with sea water. In other embodiments, the fluid may be gas, such as air, and it may be preferable to substitute it with inert gas before additive manufacturing operations.

The environmental system may comprise a pump for draining the fluid from the sealed chamber. The pump may be mounted to or otherwise carried along with the carrier or may be used at the end of the tubular body.

The environmental system is preferably configured to fill the sealed chamber with a fluid, such as a gas. Any suitable fluid may be used, as required by the relevant additive manufacturing technique used. For example, in some embodiments, the gas may be air or dried air. As noted above, the environmental system may optionally be configured to fill the sealed chamber with a liquid such as water prior to filling the sealed chamber with the gas. Where an inert gas is used, this is preferably inert with respect to the additive manufacturing technique used. For example, where an arc deposition is used then the inert gas preferably does not comprise oxygen, hydrogen or nitrogen. Examples of inert gases include argon, helium and carbon dioxide. However, many other gases may be used as appropriate for the additive manufacturing technique selected.

The environmental system may comprise a source of fluid, for example mounted to or otherwise carried along with the carrier. For example, the source of fluid may comprise a pressurised container storing a gas. Alternatively, the environmental system may comprise a connection to a remote source of fluid, for example at surface level.

The environmental system may be configured to regulate a temperature and/or pressure within the sealed chamber. For example, the environmental system may comprise one or more pressure and/or temperature sensors located within the housing. The environmental system may be configured to adjust a flow rate of gas through the sealed chamber to regulate the temperature. For example, the sealed chamber may comprise a controllable valve on an inlet into chamber and a controllable valve on an outlet to the chamber.

The system is preferably configured such that the operational tool is rotatable within the tubular body when performing the additive manufacturing operation. The system is preferably also or alternatively configured such that the operational tool is axially translatable within the tubular body when performing the additive manufacturing operation.

The system may comprise a positioning system for positioning the operational tool with respect to the carrier. The positioning system may be configured to move the operational tool freely in any direction and/or orientation or may be restricted to movement along predetermined degrees of freedom, e.g. by tracks or guides or the like.

In one embodiment, the positioning system may be configured to permit axial translation of the tool with respect to the tubular body. The positioning system may be configured to permit orbital motion of the tool inside the body, e.g. around a central axis of the tubular body. That is to say, the tool is moved along a circular or elliptical path around the inside of body.

In one arrangement, the positioning system may comprise an elongate guide extending parallel to the axis of the tubular body for controlling the axial translation and a ring-shaped guide extending around the axis of the tubular body for controlling the orbital translation, e.g. circular, elliptical or other ring-shape. The ring-shaped guide may optionally conform to the cross-sectional shape of the tubular body.

In one configuration, the ring-shaped guide may be configured to move axially along the elongate guide and the operational tool may be configured to move orbitally with respect to the circular or elliptical guide. In another configuration, the elongate guide may be configured to move in an orbital path around the circular or elliptical guide and the operational tool may be configured to move axially along the elongate guide.

The positioning system is preferably configured to permit the operational tool to reach any position inside the body. That is to say, it can be positioned at any angle from 0° through to 360°. In one embodiment, the operational tool may be capable of rotating completely inside the body.

The system may be configured to move the operational tool in a direction towards or away from the body so as to engage or disengage the operational tool from the body.

The additive manufacture operation may comprise depositing a plurality of layers of a material onto the body. The additive manufacture operation preferably uses one of directed energy deposition additive manufacture, material extrusion additive manufacture and material jetting additive manufacture. Most preferably, the additive manufacture uses material jetting additive manufacture, and particularly cold spray additive manufacture or thermal spray additive manufacture The material may be an elastomeric material, a polymeric material, a metal, concrete or other material. The material may be deposited in liquid form, powder form, or sheet material form. The material may be deposited by arc deposition.

The system may be configured to perform an additive manufacture repair operation, e.g. to repair, create or recreate a portion of the body profiles enabling installation of devices later, e.g. inner valves. monitoring sensor, or to fill a pitted surface. The system may also or alternatively be used to repair, create or recreate a protective coating material surrounding the inside of the body.

The system may optionally comprise an inspection module. The inspection module may be carried by the carrier. The inspection module is preferably capable of performing inspection of the interior surface. The inspection may be configured to perform an inspection before and/or after performing the additive manufacture operation. Any suitable inspection may be used. For example, the inspection may comprise one or more of a visual inspection, a magnetic inspection, an electrical resistance inspection, an x-ray inspection and an ultrasound inspection.

The system may optionally comprise a preparation module. The preparation module may be carried by the carrier. The preparation module is preferably capable of performing preparation of the interior surface before performing the additive manufacturing operation, such as cleaning. For example, the cleaning may comprise abrasive cleaning and/or chemical cleaning. However, any suitable preparation technique may be used. Suitable preparation techniques may include one or more of washing, etching, brushing, grinding, (liquid) blasting, and (solid) abrasive blasting.

The system may optionally comprise a finishing module. The finishing module may be carried by the carrier. The finishing module is preferably capable of performing finishing of the interior surface after performing the additive manufacturing operation, such as cleaning or polishing. The finishing may comprise abrasive cleaning and/or chemical cleaning. Exemplary finishing techniques may include one or more of washing, etching, brushing, grinding, polishing (liquid) blasting, (solid) abrasive blasting and coating. The coating may be performed by brushing and/or spraying. The coating may be polymeric coating, hard coating, such as of the epoxy type, or a soft coating, such as of the synthetic rubber type.

The carrier is preferably configured to translate within the body to reach the desired location. For example, the carrier may be a vehicle for positioning the operational tool at a desired axial location within the tubular body. The vehicle may comprise a drive mechanism for causing the vehicle to move within the body. The vehicle may comprise a housing mounted to the drive mechanism. The drive mechanism may include, for example wheels, rollers, tracks, or the like. The vehicle may be configured to bias the drive mechanism against an interior surface of the tubular body.

Whilst the carrier may be a vehicle, other carriers may also be used that translate within the tubular body. For example, the carrier may be a plug that is pushed along the tubular body by upstream pressure, for example using a fluid to push the carrier along the vehicle. The carrier may then form a seal against the interior surface of the tubular body to allow the pressure to push the carrier along the tubular body. In yet another embodiment, the carrier may be translated by using a toe line to pull the carrier along the tubular body. In yet a further embodiment, the carrier may be translated by gravity, for example by being lowered on a support line down a tubular body that is oriented substantially vertically or at a sufficient angle to the horizontal.

In various embodiments, the tubular body is a subsea tubular body. Examples may include risers or subsea pipelines.

In a preferred aspect, the present invention may comprise a kit including the described system for performing an operation on an interior surface of a tubular body and a system for performing an operation on an exterior surface of a tubular body.

Optionally, the system for performing an operation on the interior surface of the tubular body may further comprise a housing external to the housing configured to form a sealed chamber external to the housing. This may be useful when repairing a leak to prevent fluid external of the tubular body from entering the sealed chamber inside the tubular body. The housing external to the tubular body may be part of a system according to the first aspect. Thus, an operation may be performed both internally and externally of the tubular body.

Viewed from a fourth aspect, the present invention provides a method of performing an operation on an interior surface of a tubular body, the method comprising: establishing a sealed chamber within the tubular body; establishing a controlled environment within the sealed chamber; and performing an additive manufacture operation on a portion of the interior surface of the tubular body within the sealed chamber. Optionally the method may be performed by the system described above and may include any one or more or all of the optional features thereof.

The additive manufacture operation may comprise a repair operation. Alternatively, the additive manufacture operation may comprise construction of a new structure within the elongate body. For example, the structure may comprise one of a flange, a nipple, a mount for other components. The structure may comprise a moving component, such as a valve member.

Thus, additive manufacture repair operation may repair, create or recreate a portion of the body profile, may enable installation of devices later, e.g. inner valves, monitoring sensors, etc., or may fill a pitted surface. The method may also or alternatively be used to repair, create or recreate a protective coating material surrounding the inside of the body.

The additive manufacturing operation may be performed by an operational tool. The operational tool may be mounted to a carrier. The method may comprise engaging the carrier with an interior surface of the tubular body to prevent axial movement of the carrier during additive manufacturing operation. Optionally establishing the sealed chamber also locks the carrier in position within the tubular body.

The method may comprise draining a fluid from the sealed chamber. The fluid may comprise any fluid present in the tubular body. For example, the fluid may comprise a produced hydrocarbon fluid such as hydrocarbon liquids (e.g. oils) or hydrocarbon gases. In other embodiments, the fluid may comprise water. In yet further embodiments, the fluid may be a gas, such as air. The filling and draining may be performed simultaneously, for example such that the fluid is displaced or replaced by the other fluid.

The method may comprise fill the sealed chamber with a liquid, such as water, to evacuate a fluid in the sealed chamber, such as hydrocarbon gas. The liquid may then be pumped out of the sealed chamber.

The method may further comprise filling the sealed chamber with a gas. Any suitable gas may be used, as required by the relevant additive manufacturing technique used.

The method may comprise regulating a temperature and/or pressure within the sealed chamber. For example, the regulating may comprise adjust a flow rate of gas through the sealed chamber to regulate the temperature.

The additive manufacture operation may comprise depositing a plurality of layers of a material onto the body. The additive manufacture operation preferably uses one of directed energy deposition additive manufacture, material extrusion additive manufacture and material jetting additive manufacture. Most preferably, the additive manufacture uses material jetting additive manufacture, and particularly cold spray additive manufacture or thermal spray additive manufacture The material may be an elastomeric material, a polymeric material, a metal, concrete or other material. The material may be deposited in liquid form, powder form, or sheet material form. The material may be deposited by arc deposition.

The method may comprise performing inspection of the interior surface. The inspection may be configured to perform an inspection before and/or after performing the additive manufacture operation. Any suitable inspection may be used. For example, the inspection may comprise one or more of a visual inspection, a magnetic inspection, an electrical resistance inspection, an x-ray inspection and an ultrasound inspection.

The method may comprise performing preparation of the interior surface before performing the additive manufacturing operation, such as cleaning. For example, the cleaning may comprise abrasive cleaning and/or chemical cleaning. However, any suitable preparation technique may be used. Suitable preparation techniques may include one or more of washing, etching, brushing, grinding, (liquid) blasting, and (solid) abrasive blasting.

The method may comprise performing finishing of the interior surface after performing the additive manufacturing operation, such as cleaning or polishing. The finishing may comprise abrasive cleaning and/or chemical cleaning. Exemplary finishing techniques may include one or more of washing, etching, brushing, grinding, polishing (liquid) blasting, and (solid) abrasive blasting.

Performing the operation comprises moving the operational tool along a trajectory with respect to the internal surface of the tubular body. The method may further comprise calculating the trajectory based on a comparison between a computer model of a structure to be manufactured and the internal surface of the tubular body. The moving may comprise a combination of linear translation of the tool in the axial direction of the tubular body and orbital motion of the tool around the axis of the tubular body. Performing the operation may comprise moving the operational tool along an oscillating orbital path.

The method may comprise establishing a second sealed chamber external to the tubular body. The method may comprise establishing a controlled environment within the second sealed chamber. The method may comprise performing an additive manufacturing operation on an external surface of the tubular body in accordance with the method of the second aspect.

In various embodiments, the tubular body is a subsea tubular body. Examples may include risers or subsea pipelines.

Within the context of the present invention, it will be appreciated that the quality of the sealing need not be perfect. For example, a small degree of leakage may be permitted so long as the sealing still enables sufficient control of the operational environment. That is to say, sealing with a certain degree of leakage can be accepted, as long as the fluid leaking in is continuously or regularly evacuated so as not to threaten the quality of operations within the housing. The sealing may also allow leakage out, for example of a substituting gas out in the outer environment, for example seawater. The above cases of "dynamic" sealing should be understood as falling within the definition of sealing according to the invention.

In one example, the seal may be sufficient to provide a rate of leakage into or out of the sealed chamber of less than 10% of the volume of the sealed chamber per hour during normal operating conditions.

Certain preferred embodiments of the present invention will now be described in greater detail by way of example only and with reference to the accompanying drawings, in which.

FIG. 2 shows a detailed view of an operational module of the operations system of FIG. 1;

FIGS. 14A-D illustrate a pinhole repair operation.

Figure 1:
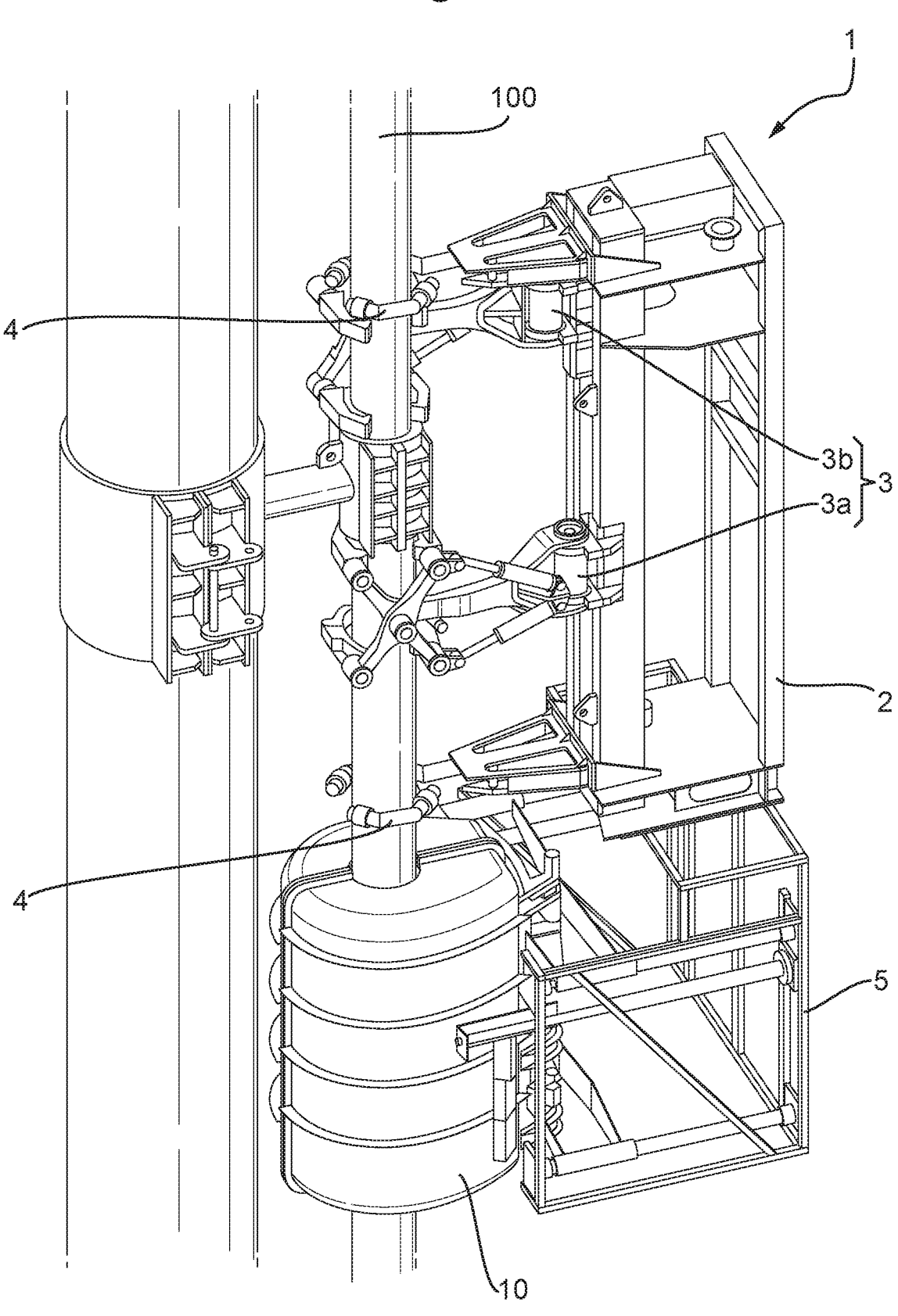
FIG. 1 shows a subsea operations system.

FIG. 1 shows a vehicle 1 for rotating and translating an operational module 10 around and along an elongate body 100. The elongate body 100 is preferably a tubular body, for example a subsea pipeline such as a riser. However, other elongate bodies may include, for example, subsea elements such as platform legs, concrete structures, scaffolding, and the like. The elongate body may have any cross-sectional shape. Circular is most common, but the elongate body 100 may have a cross-sectional shape that is square, polygonal etc.

For the sake of illustration, the following discussion relates generally to the example of risers, but the vehicle 1 will find relevance for all sorts of elongate bodies 100.

The vehicle 1 comprises a support structure 2 providing a backbone of the vehicle 1, a translation mechanism 3 for translating along the elongate body 100, and an optional guide arrangement 4 for maintaining the position of the vehicle 1 with respect to the elongate body 100. The operational module 10 is, in this embodiment, carried by the support structure 2 of the vehicle 10.

The translation mechanism 3, together with the guides 4, is designed to hold the support structure 2 away from elongate body 100 such that it can move past protuberances on the body of the elongate body 100.

The translation mechanism 3 comprises two gripper arms 3a, 3b. Each of the gripper arms 3a, 3b has a gripper portion shaped to grip the elongate body 100 and an arm portion for holding the support structure 2 away from the elongate body 100. When engaged, each of the gripper arms 3a, 3b is independently capable of carrying the full weight of the vehicle 1.

Each of the gripper arms 3a, 3b is hingedly mounted on the support structure 2 in a manner that allows the respective gripper portions to be swung away from the elongate body 100. This permits the gripper arms 3a, 3b to move past any protuberances on the body of the elongate body 100.

A first gripper arm 3a is mounted to the support structure 2 such that it does not move in the axial direction of the elongate body 100. A second gripper arm 3b is mounted to the support structure 2 so as to be translatable with respect to the support structure 2 in the axial direction of the riser 10. A linear actuator is connected at one end to the second gripper arm 3b and at the other end to the support structure 2, so as to effect the axial translation of the second gripper arm 3b. In order to cause the vehicle 1 to translate along the elongate body 100, in the downwards direction in FIG. 1, the following sequence of actions occur. It will be appreciated that the reverse sequence will move the vehicle 1 in an upwards direction in FIG. 1.

a. The first gripper arm 3a engages and grips the elongate body 100.

b. The second gripper arm 3b releases the elongate body 100 and is swung aside, such that the first gripper arm 3a is carrying the weight of the vehicle 1.

c. The actuator is retracted to cause the second gripper arm 3b to move past the first gripper arm 3a in the axial direction of the elongate body 100.

d. The second gripper arm 3b engages and grips the elongate body 100.

e. The first gripper arm 3a releases the elongate body 100 and is swung aside, such that the second gripper arm 3b is carrying the weight of the vehicle 1.

f. The actuator is extended causing the support structure 64 to be moved downwards, moving the first gripper arm 3a past the second gripper arm 3b and returning the vehicle 1 to its initial configuration.

As will be appreciated, one of the gripper arms 3a, 3b is engaged with and gripping the elongate body 100 at every stage of the movement. Each of the gripper arms 3a, 3b is configured so that they will not release the elongate body 100 in the event of power failure. Thus, should the vehicle 1 suffer a power failure, it will not detach from the elongate body 100 or move along the elongate body 100.

This hand-over-hand movement action permits the vehicle 1 to easily traverse protuberances on the elongate body 100 without becoming disengaged from the elongate body 100.

The vehicle 1 also incorporates a plurality of guides 4 for aligning the vehicle 1 with the elongate body 100 and hence centring the operational module 10 with respect to the elongate body 100. Each guide 4 comprises a plurality of rollers shaped to engage the elongate body 100. The rollers are supported by a guide arm that is pivotally connected to a yoke mounted to the support structure 2. The guide arms are held in a neutral position where the guide arms hold the rollers in contact with the riser 100. When the guides reach a protuberance on the elongate body 100, the rollers are pushed away from the neutral position to allow them to pass over the protuberance. After passing, the rollers are returned to their neutral position to engage the elongate body 100 on the other side.

By virtue of its design, the vehicle 1 is capable of reaching a pipeline 100 at any location along its length. The vehicle 1 may also be brought to its operation location directly by any transport or carriage means. For example, when used subsea, it may be carried and installed by a subsea vehicle, such as a ROUV, or divers.

The operational module 10 is arranged to perform an operation on the elongate body 100, such as a repair operation, a maintenance operation, an installation operation, or an upgrade operation. More specifically, the operational module 10 is configured to use additive manufacturing techniques to carry out the operation.

Figure 2:
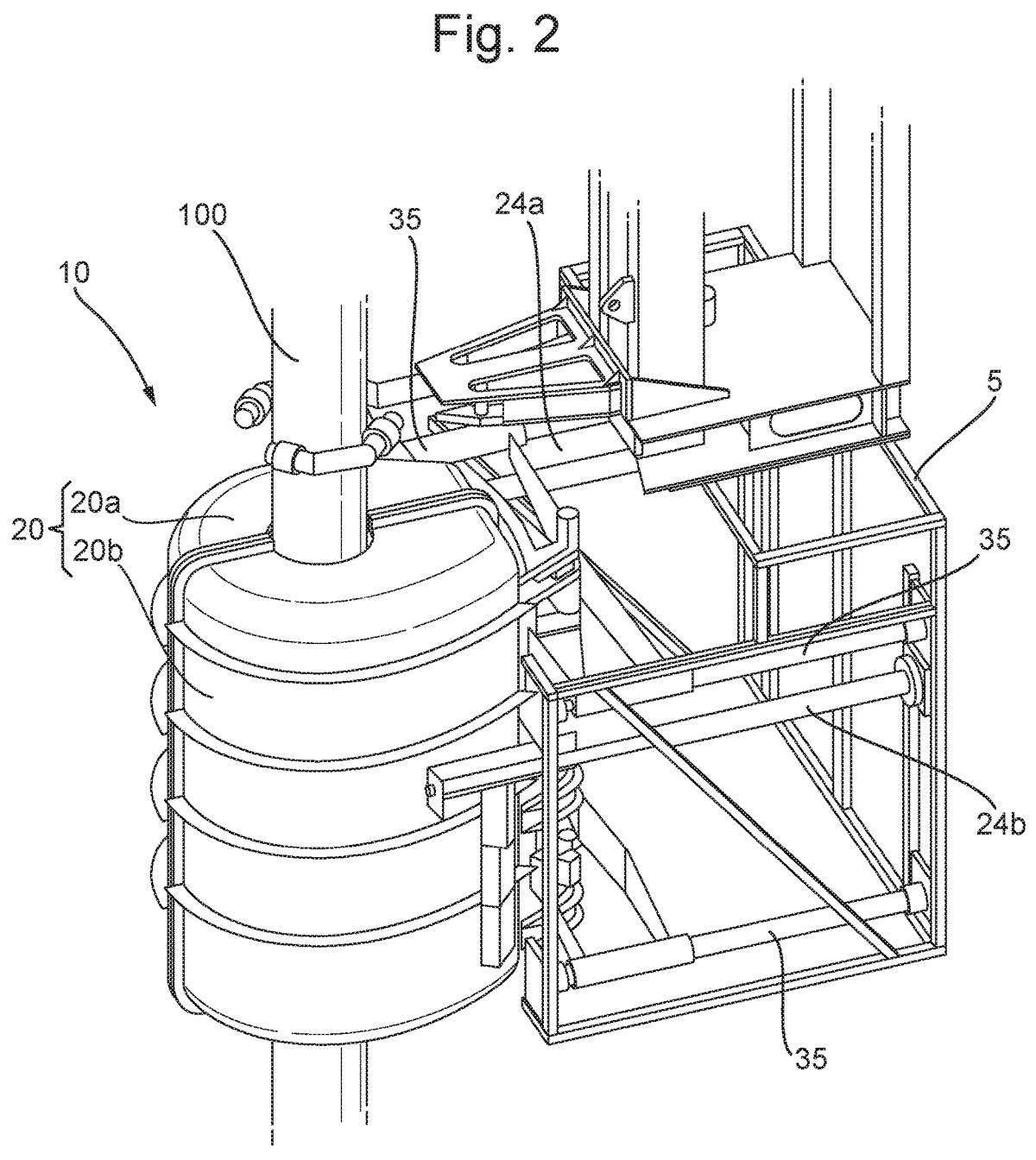
Figure 3:
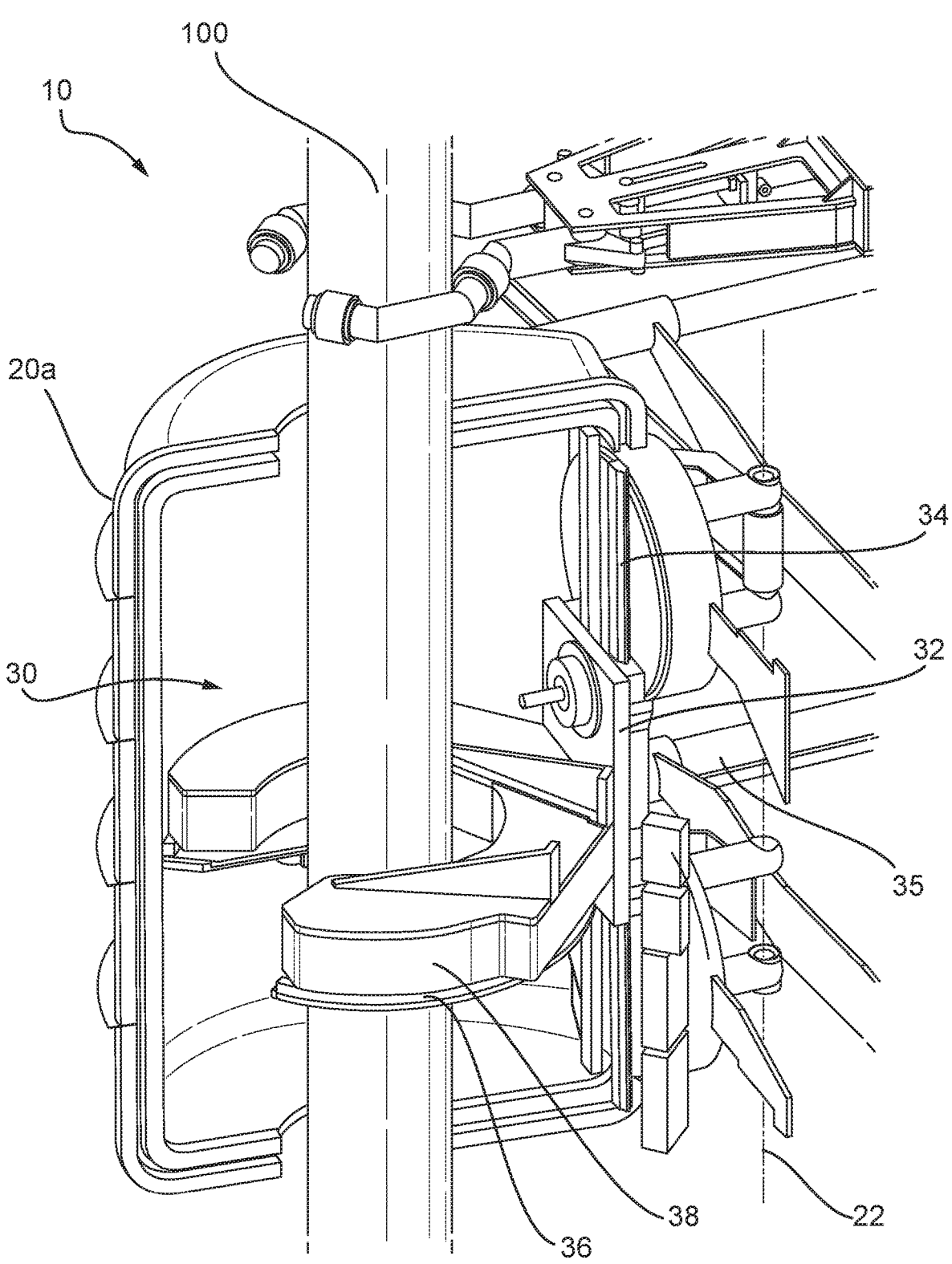
FIG. 3 shows a cutaway view of an operational module of the operations system of FIG. 1.
Figure 4:
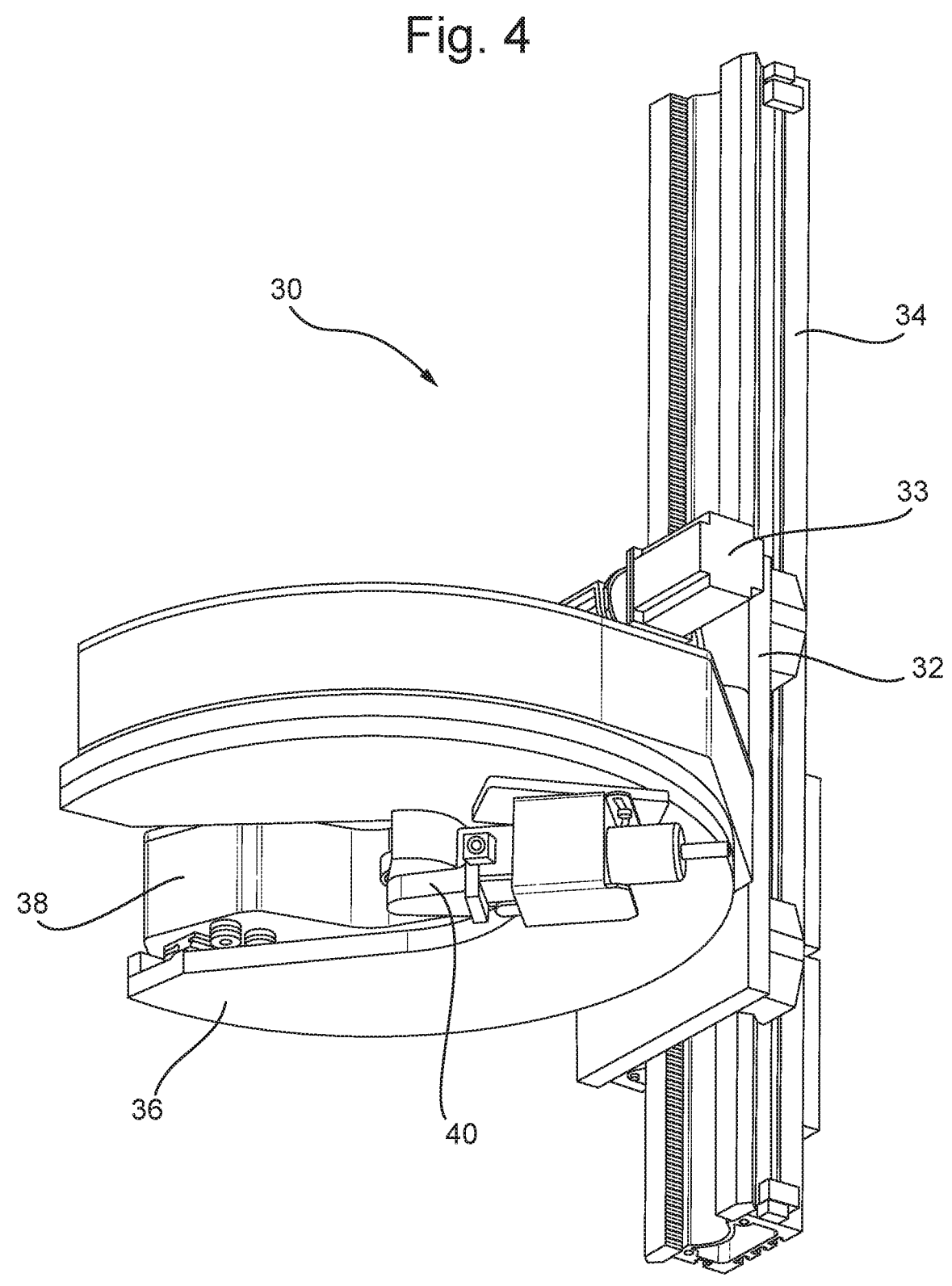
FIG. 4 illustrates a positioning system and operational tool of the operational module of FIG. 2.

With reference to FIGS. 2 to 4, the operational module 10 comprises a housing 20 for establishing a controlled environment around a segment of the elongate body 100.

Within the housing 20 is received a positioning system 30 carrying an operational tool 40 for performing the operation on the elongate body 100 within the controlled environment. In FIG. 3, one segment 20b of the housing 20 and the axial translation motor 33 are hidden to reveal details of the positioning system 30. In FIG. 4, only the positioning system 30 and operational tool 40 are shown.

Prior to perform an operation, a controlled environmental is established around the segment of the elongate body 100 using the environmental control housing 20. The housing 20 is shaped to surround the elongate body 100, establishing a sealed chamber between the housing 20 and the elongate body 100. Once the sealed chamber has been established, the vehicle 1 is capable of draining water from the sealed chamber and performing an operation on the elongate body 100 using the operational tool 40.

It is envisaged that an umbilical may connect the vehicle 1 to the surface to supply a source of fluid for expelling water from the sealed chamber. The fluid may be air or other gas, pure water, a cleaning fluid or other agent. In some alternative arrangements the vehicle 1 may include a local source of pressurised gas or other agent to supply the fluid.

The housing 20 comprises two housing segments 20a, 20b (see FIG. 2). When engaged with one another around the elongate body 100, the housing segments 20a, 20b form the sealed chamber. The housing segments 20a, 20b are similar in nature to those described in WO2012/013847. However, instead of being separated by linear movement, the housing segments 20a, 20b are separated by a rotational movement about a pivot axis 22. Thus, the housing 20 can disengage completely from the elongate body 100 allowing the vehicle 1 to pass protuberances or to attach/detach from the elongate body 100 at any location along its length.

The housing 20 is carried by a frame 5 mounted to a support structure 2. The frame 5 is shaped so that the housing segments 20a, 20b will close around the elongate body 100 when mounted to the support structure 2 of the vehicle 1, which is held at a predetermined distance from the elongate body 100 by the translation mechanism 3 and the guides 4. However, it will be appreciated that alternative structure types may be used for supporting and/or positioning the housing 20.

The movement of each of the housing segments 20a, 20b is controlled by a respective actuator 24a, 24b mounted between the frame 5 and each housing segment 20a, 20b, although alternative solutions may be used. When in their separated position, the housing segments 20a, 20b are capable of passing a protuberance on the riser 100.

The housing 20 is designed to maintain the controlled atmosphere around the zone of pipe processing, and is equipped with suitable jointing and fluid control solutions in order to be able to remove water around the segment of riser to process and control the environment atmosphere. To seal against one another, at least one of the housing segments 20a, 20b includes a seal along its free edges. A seal is also provided for sealing the housing 20 against the elongate body 100, which may comprise a seal stack. A seal stack may be required as the elongate body 100 is often corroded or worn and so may have a poor surface for sealing.

The vehicle 1 can also be designed to collect and process leakages, for example leaked contents from the elongate body 100. The vehicle 1 may also collect and process debris generated by the operational tool 40. The leakages and/or debris may be captured by the housing 20 and extracted by any suitable extraction means.

The positioning system 30 comprises a platform 32 translatable along a guide rail 34 connected to the frame 5. The platform 32 carries a collar 36, 38 designed to partially surround the elongate body 100 and position an operational tool 40 in a desired axial and rotational position with respect to the elongate body 100. The positioning system 30 is also illustrated in FIGS. 2 and 3.

The platform 32 can be translated axially with respect to the elongate body 100 by moving along the guide rail 34 by any suitable translation means. For example, the translation means may be driven by a motor 33 and may comprise wheels or rollers, a rack and pinion arrangement, or the like. The guide rail 34 enables and guides the translation. In various embodiments, other translation guide arrangements may be used, such as beams, wires, or an assembly connected to the elongate body 100 itself. In the further embodiments, yet other solutions known in the art to allow translation may be used, such as wheels engaging directly with the elongate body 100.

The platform translation can be driven by a dedicated platform motor 33 along the guide rail 34 carried by the vehicle 1. In some embodiments, the platform 33 can also or instead be translated simply the translation of the vehicle 1 itself with respect to the elongate body 100.

In the illustrated embodiment, the guide rail 34 is connected to the vehicle 1, and particularly the support frame 5, by an actuator 35 to move the guide rail 34 and platform 32 towards and away from the elongate body 100. This causes a collar carried by the platform 32 to engage with and disengage from the elongate body 100. In one embodiment, the entire module 10 is connected to the frame 5 via the actuator, such that the module 10 may be moved as a whole away from and towards the elongate body 100.

The segments 20a, 20b of the housing 20, in the illustrated embodiment, form a seal against the edges of the guide rail 34, such that the guide rail 34 forms part of the housing 20 enclosing the sealed chamber. However, in other embodiments, the guide rail 34 may be completely enclosed within the sealed chamber of the housing 20.

The platform 32 carries a collar. The collar comprising at least a rotating C-shaped element 36, referred to as the rotating C-ring 36. The rotating C-ring 36 is designed to be able to rotate around the elongate body 100, as will be explained below.

The collar may optionally also comprise a static C-shaped element 38, referred to as the static C-ring 38. The platform 32 and the static C-ring 38 may be formed as a single piece. In absence of a static C-ring 38, the rotating C-ring 36 may alternatively be connected directly to the platform 32.

The described C-rings 36, 38 are examples of support structures having notches for receiving the elongate body 100, but it will be appreciated that the positioning system 30 is not limited to C-shaped support structures and may be embodied using alternative support structure arrangements.

The rotating C-ring 36 can be guided under rotation with respect to the elongate body 100 by means of a rotational mechanism connected to the static C-ring 36 or the platform 32. The rotational mechanism for the rotating C-ring 36 may comprise wheels or rollers driven by a motor, rack and pinion, belts or the like.

For example, after engagement and central relative positioning of the positioning system 30 around the elongate body 100, the rotating C-ring 36 can be operated by rotation of belts by a motor on the static C-ring 38, which rotate a pinion on the static C-ring 38 engaging a rotation rack 13 fixed on the rotating C-ring 36.

Although these are not represented, there are other solutions known in the art for ensuring rotation of the rotating C-ring 36, such as belts, wires, hydraulic or electrical pistons. Any suitable alternative solution known in the art for rotating the C-rings 36 may be used.

The rotating C-ring 36 can be rotated around the elongate body 100 at various speeds and in either direction, either alone or in combination with a translational movement of the platform 32. The accuracy of the position or the speed of the rotation can easily be adapted for various applications. This allows an operational tool 40 mounted to the rotating C-ring 36 to move precisely along a pre-defined trajectory.

In one embodiment, power and/or control signals can be transferred to the rotating C-ring 36 by means of hydraulic hoses, electrical cables or the like. In this case, the rotating C-ring 36 could be operated in an oscillating movement, with a series of alternating spinning movements.

In one embodiment, power can be stored "locally" on the rotating C-ring 36 by means of electrical battery packs, hydraulic accumulators, pneumatic accumulators, spring forces or the like. In such an embodiment, power can be supplied to the modules, which still permitting a continuous rotation of the rotating C-ring 36.

In one embodiment, power and control signals can be transferred to the rotating C-ring 36 by means of electrical, hydraulic, optical or other slip rings known in the art. A local power solution may also be installed in the static C-ring 38, or elsewhere on the vehicle 1, and power transmitted to the rotating C-ring 36 by solutions listed above.

In one embodiment, control signals may be transmitted to the rotating C-ring 36 using wireless communication technology.

All combinations of the mentioned embodiments can be combined, e.g. power supply from a locally source and remotely controlled via an optical slip ring.

In one embodiment the operational module 10 is used to repair the elongate body 100, by use of additive manufacturing techniques, also known as 3D printing. Additive manufacturing refers to the manufacture of 3D structures by depositing layer-upon-layer of material. In various embodiments, the material may be a polymer material, a metal, concrete or other materials. The material may be deposited in liquid form, powder form, or sheet material form. The material may also be deposited by arc deposition, such as is used when welding.

One particular additive manufacture technique that may be particularly applicable is known as cold spray additive manufacture, which is a type of material jetting additive manufacture. Cold spray additive manufacture is the deposition of powder material onto a substrate using pressurised gas, usually at supersonic speeds. The pressurised gas used, often nitrogen or helium, is at high pressure and temperature, for example up to 70 bar and 1100° C. The 'cold' part of name of the process refers to the fact that the powders used are not melted; instead, the very high velocity causes the powder to plasticise on impact, forming a solid-state metallurgical bond with the substrate.

Cold spray forming has a much larger 'spot size' than other powder-fed additive manufacture techniques, at around 4 mm. It is therefore best suited for application of coatings, such as corrosion-resistant or wear-resistant coatings, and dimensional restoration and repair.

The illustrated operational module 10 may encounter various difficulties due to the on-site operating environments, such as vibrations, positioning challenges due to the complex surface, and the nozzle not being orientated vertically downwards (as would be typical for an indoor case). Cold spray additive manufacture is particularly well suited to overcoming these challenges, as it uses a relatively wide spray, it does not need to be positioned exactly against the surface, and the high pressure gas means that it can be used in any orientation.

The operational tool 40 can be designed to allow different operations with different materials and production characteristics without requiring human intervention. For example, a nozzle and/or a feed material (e.g. in form of wire, powder, fluid etc. . . . ) can be during same operation—for example under controlled environment—substituted for a different one. The feed material can for example be given a standardised container in the form of a cartridge, so as to be easily substitutable.

To perform the operation, a computer model of the component to be repaired or produced will be first prepared. The operational module 10 will then inspect the surface of the elongate body 100 and determine where material must be added to arrive at the desired structure. An additive manufacture trajectory will then be determined and the positioning system 30 will be controlled to move the operational tool 40 along the trajectory in order to lay downs or add successive layers of material to fabricate the structure.

The operational module 10 may be used to repair, create or recreate pipe flanges, pitted pipe surface or other mechanical parts, and/or fixtures outside of the elongate body by use of additive manufacturing techniques, preferably based on the use of metal powder. In one example, the operational module may be used to create a crook to support a floater.

In one example, the operational module 10 may be used when performing hot-tapping on a submerged pipeline. This technique involves perforating the pipe and forming a tee, cap or plug at the perforation. Then, different tools for intervention are inserted in the pipe in a controlled manner.

As an alternative to the known through-flowline intervention technique for insertion of tools, the operational module 10 may be used to manufacture the tee directly, after simultaneous external and internal sealing in order to control the additive manufacturing. Any fitting or insertion hole (e.g. for sensors) can be created using such a technique.

The operational module 10 may also or alternatively be used to repair, create or recreate a protective coating material surrounding the elongate body 100, by use of additive manufacturing techniques, preferably based on the use of polymeric powder or polymeric sheet material. For example, such coatings are commonly manufactured from neoprene rubber or polyethylene.

In another embodiment, the operational module 10 can be mounted to a pipeline 100 under construction, which may be either subsea or on land. As pipe units are added to the section of the pipeline that has already been installed, the operational module 10 may work on each new pipe unit. For example, the operational module may apply a coating to the pipe unit and/or the operational module 10 may treat a connection between the pipe units. The operational module 10 may for example use a combination of blasting, coating spraying and a paint finishing.

As the positioning system 30 can translate and rotate, the combination of both movement allow the operational tool 40 to reach potentially any point on the segment of the elongate body 100 enclosed by the housing. It may thus be used to install various sensors such as sensor patches, vibration sensors or strain sensors. It may also be used to install at precise positions multiple longitudinal or rotation position tags for calibrating a position of the vehicle 1, a module carried by the vehicle 1, or any other element moving along the elongate body 100. Such position tagging will enable improved location calibration, facilitating programmable, repeatable, automated positioning of the operational tool 40

It will be appreciated that the operational tool 40 may have several deposition nozzles connected to a single additive manufacture machine or indeed may comprise multiple additive manufacture machines, each having one or more nozzles. Thus, the operational module 10 may be capable of depositing different materials as required.

In preferred embodiments, one or several tubes may connect the operational tool 40 to a reservoir of deposition material. The elongate body 100 will then be processed by oscillating the rotating C-ring 36 so as to cover at least 360° of the elongate body 100 without continuous rotation of the rotating C-ring 36, which would very quickly damage the feeding tube. For example, the rotating C-ring 36 may oscillate 180° to each side of a rest position, but other modes of oscillation are possible and are easy to program on any control unit.

In various embodiments, the operational module 10 may be provided with a cleaning tool (not shown). For example, the cleaning tool may be mounted to the positioning system 30. The cleaning tool may be configured to remove debris from the surface of the elongate body 100. In some embodiments, where a chemical coating has been applied to the surface of the elongate body 100, the cleaning tool may strip the coating from the elongate body 100 to permit a good bond when performing the additive manufacture.

Any suitable cleaning tool may be used. For example, the cleaning tool may use a brush or similar cleaning element to dislodge debris on the surface of the elongate body 100. The cleaning tool may additionally or alternatively use fluid jets, such as air or water, optionally also comprising an abrasive (e.g. sand blasting) to remove material from the surface of the elongate body 100.

Whilst the cleaning tools is preferably located within the housing and the cleaning is preferably performed after the controlled environment has been established, it will be appreciated that in alternative arrangements, the cleaning module may be provided elsewhere on the vehicle 1 or indeed may be carried out by a separate system. In some embodiments, cleaning may not be required.

The positioning system 30 is preferably steered by a control unit (not shown), in the form of a computer, a programmable logic circuit (PLC), a printed circuit or any electronic data processing equipment. The control unit receives signals from all types of input from sensors, whether for inspection, location, or operational control of the positioning system 30 or any tool 40 borne by the positioning system 30, failure sensors included.

After processing of incoming data, the control unit may in turn adapt and optimise operation of the system 30 or tool 40, or it may trigger an alarm towards another data processing equipment or an operator, present locally or remotely. It may control routines of maintenance or preventive replacement.

The control unit may be unique, or multiple units in parallel or within a master-slave chain of command. As an example on how complex the control hierarchy may be, the control units may be the following:

At the headquarters of the operating company
At the location offices
On a carrier vehicle
On the multitask vehicle of the invention
On the module performing the required processing
On a sensing device mounted on the module
But not all these control units are required.

The housing 20 and/or tool 40 may have their own control units, separate from that of the positioning system 30. These control units could be slaves to a master central control unit. The control units may be embedded, or remote, and all telecommunications solutions of the art can be used for the invention, for example between the location operation centre offshore and a remote operation centre onshore.

In the case of the housing 20, the control unit(s) may control the environment surrounding the tool 40. The control unit(s) may also measure and/or control extraction flow, quantity of volatile components, rate of humidity, temperature etc. . . .

All units, control units, mechanical and hydraulic units, sensors etc. . . . can be powered by electro-magnetic, mechanical, pneumatic or hydraulic sources or any other suitable power source known in the art.

Some or all units can be powered by autonomous battery packs. Or some units may also be powered by for example hydraulic energy generated within the elongate body 100, or by for example a micro-turbine.

All power and control lines may be wireless, or wired. Wired connections may be in the form of electrical or optic cables. Connections and supplies may also be pneumatic, hydraulic, or directly mechanical.

The vehicle 1 and operational module 10 are preferably automated. Thus, the vehicle 1 may be able to perform automated repair of the elongate body 100. It will be appreciated that one or both of the vehicle 1 and/or the operational module 10 may in some embodiments be remotely steered and/or operated, or a hybrid solutions may be implemented (e.g. a diver could steer the operational tool 40 with a manual control terminal).

Whilst a first exemplary operational module 10 is illustrated in FIGS. 1 to 4, various alternative operational modules may be employed.

Figure 5:
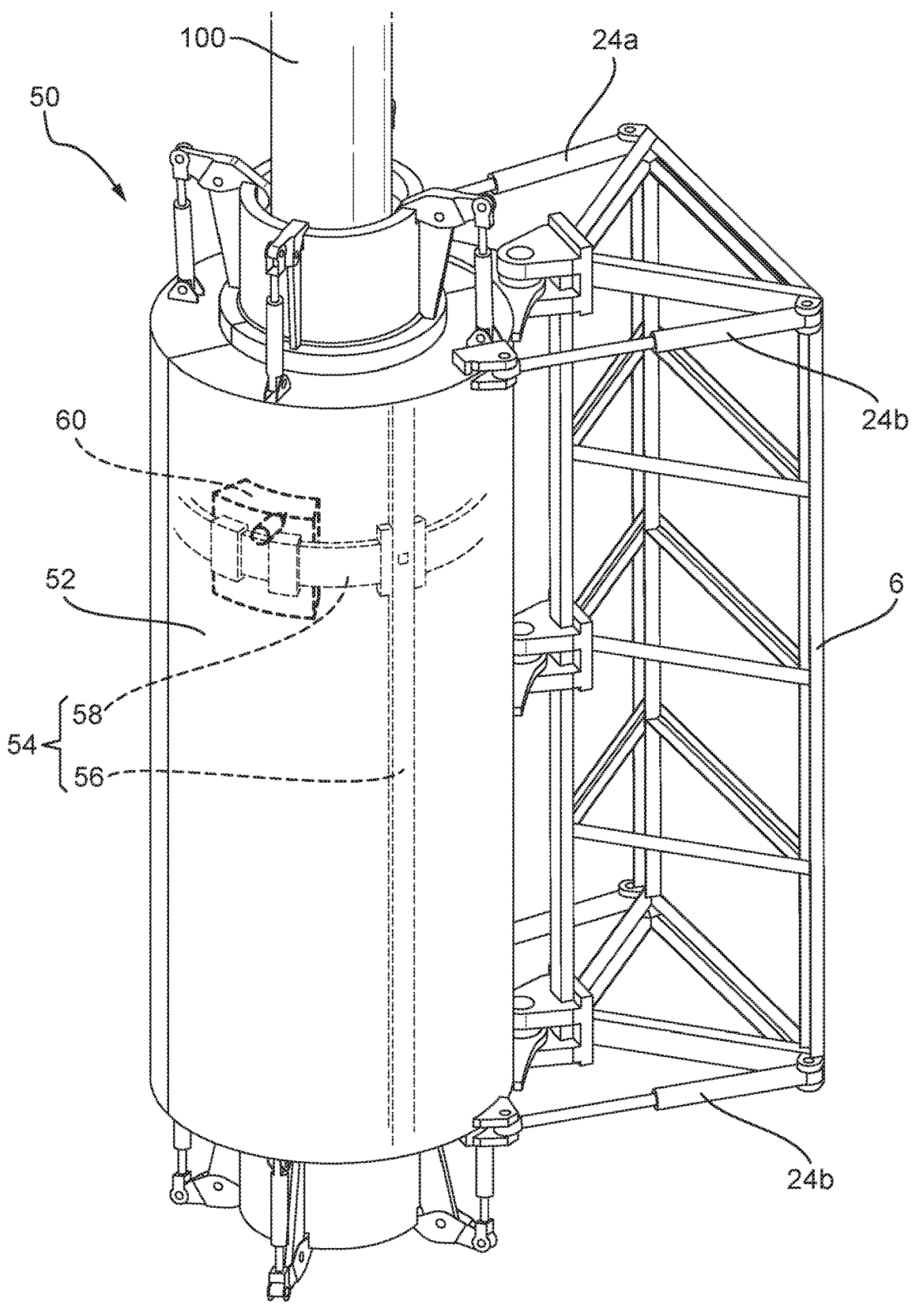
FIG. 5 illustrates an alternative configuration of an operational module.
Figure 6:
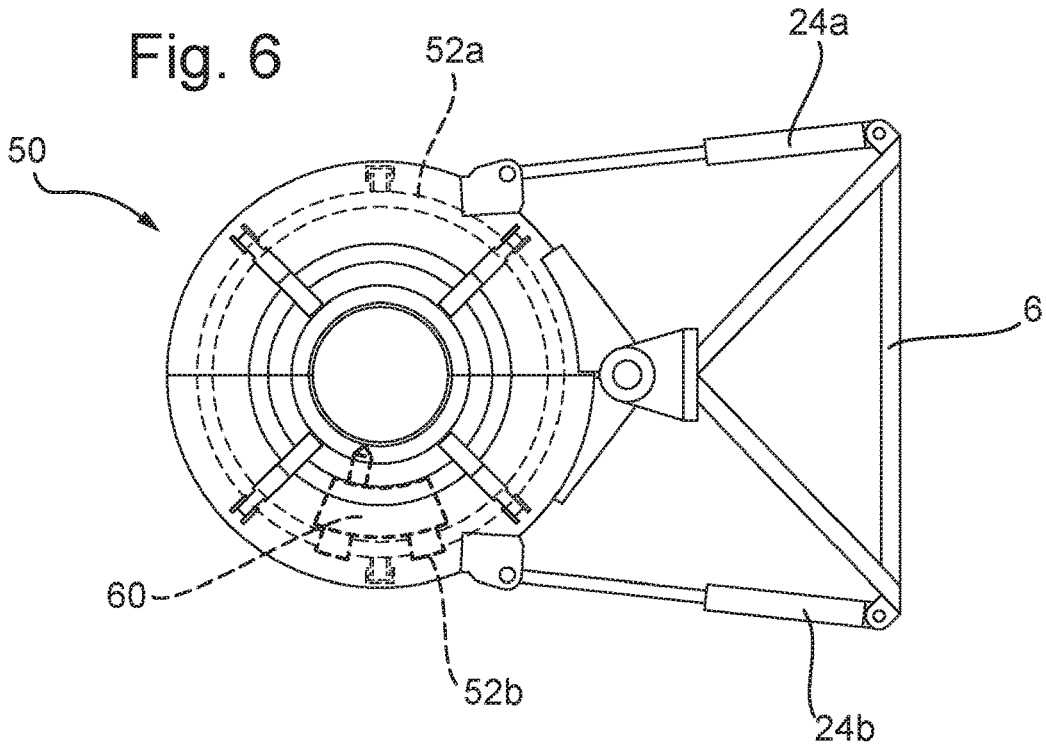
FIGS. 6 and 7 illustrate the operational module of FIG. 5 in an open position and in a closed position.
Figure 7:
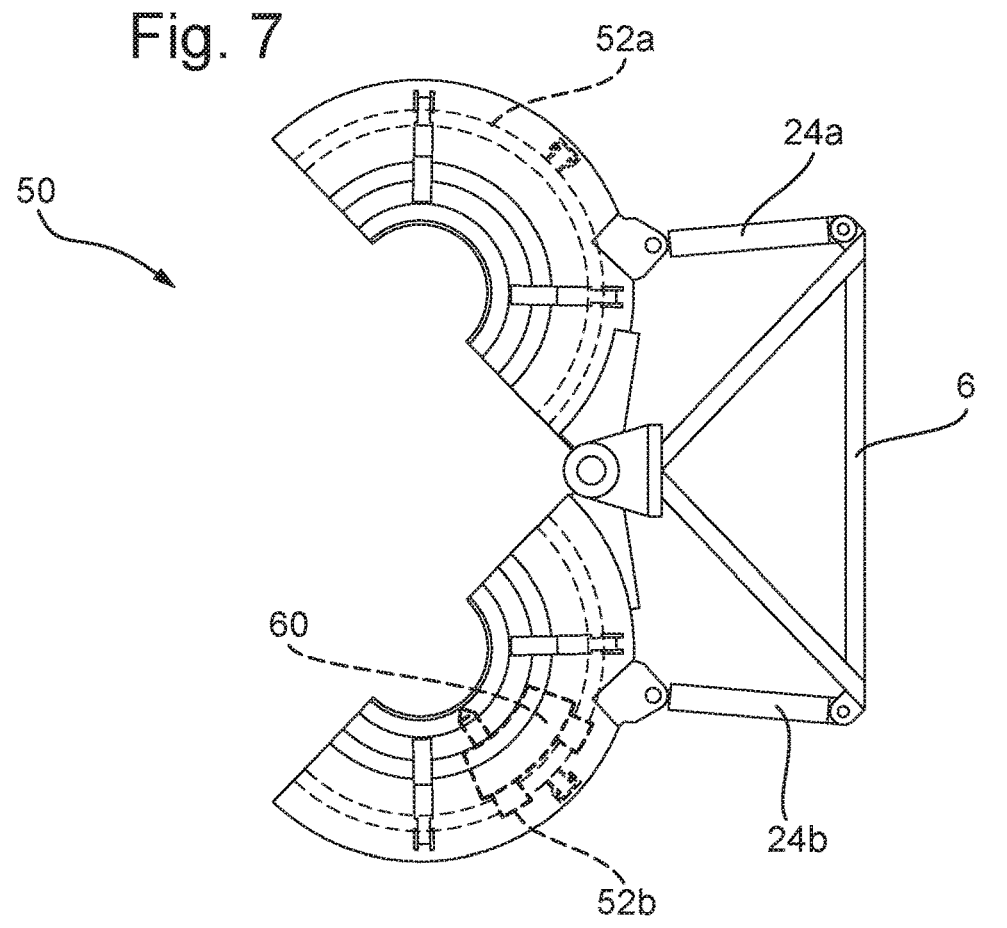

FIGS. 5 to 7 illustrate a second embodiment of an operational module 50. In this embodiment, the operational module comprises a housing 52 of similar construction to the housing 20 of the first operational module 10. However, the second embodiment of the operational module 50 includes a different arrangement of the positioning system 54.

The positioning system 54 in this embodiment comprises an axial guide rail 56 mounted to each of the housing segments 52a, 52b that extends substantially parallel to the elongate body 100 and an annular guide rail 58 translatable along the axial guide rails 56. Any suitable means may be used for translation of the annular guide rail 58 along the axial guide rails 56. For example, a rack and pinion arrangement may be used.

The operational module 60 is mounted to the annular guide rail 58 so as to rotate with respect to the elongate body 100. This may be achieved either by rotating the operational module with respect to the annular guide rail 58 or by rotating the entire annular guide rail 58.

The annular guide rail 58 is formed as two semi-annular rails, with one semi-annular rail being mounted to each axial guide rail 56. Thus, when the housing segments 52a, 52b are swung apart to disengage from the elongate body as shown in FIG. 7, the annular guide rail 58 separates to allow the module 50 to disengage from the elongate body 100.

The operational tool 60 operates in substantially the same manner as the operational tool 40 of the first embodiment.

Whilst the illustrated embodiment shows fixed axial guide rails 56 and axially translatable annular guide rails 58, it will be appreciated that an alternative configuration may include fixed annular guide rails 58 and a rotationally translatable axial guide rail 56, where the operational tool 60 is mounted to the axial guide rail 56.

In this embodiment, the frame 6 for mounting the operational module 50 to the vehicle 1 is shown as a fixed frame as the positioning system 54 does not need to be disengaged from the elongate body 100 separately from the housing 52. However, an actuatable frame similar to the frame 5 of the first embodiment may be used if desired.

Figure 8:
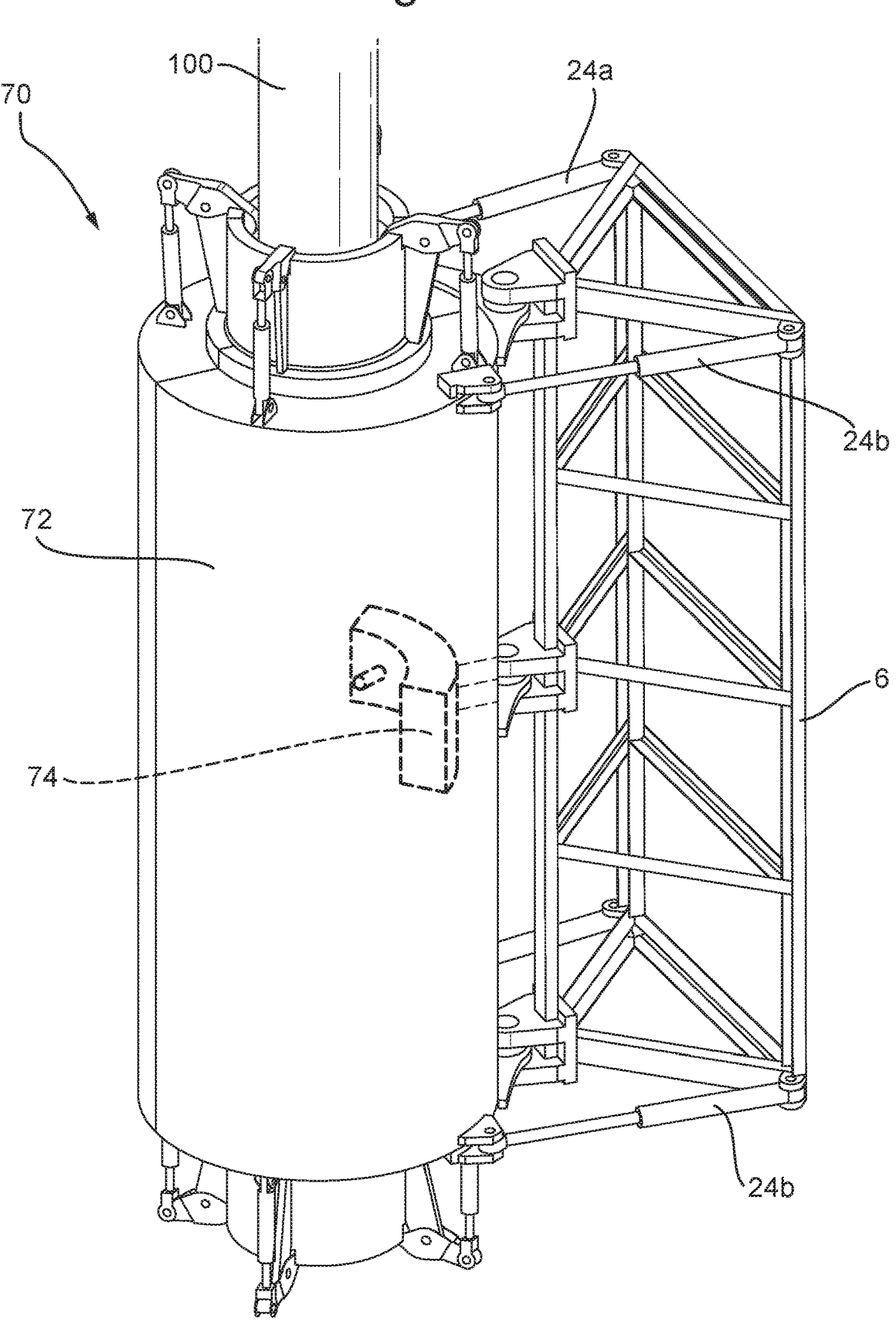
FIG. 8 illustrates a further alternative configuration of an operational module.
Figure 9:
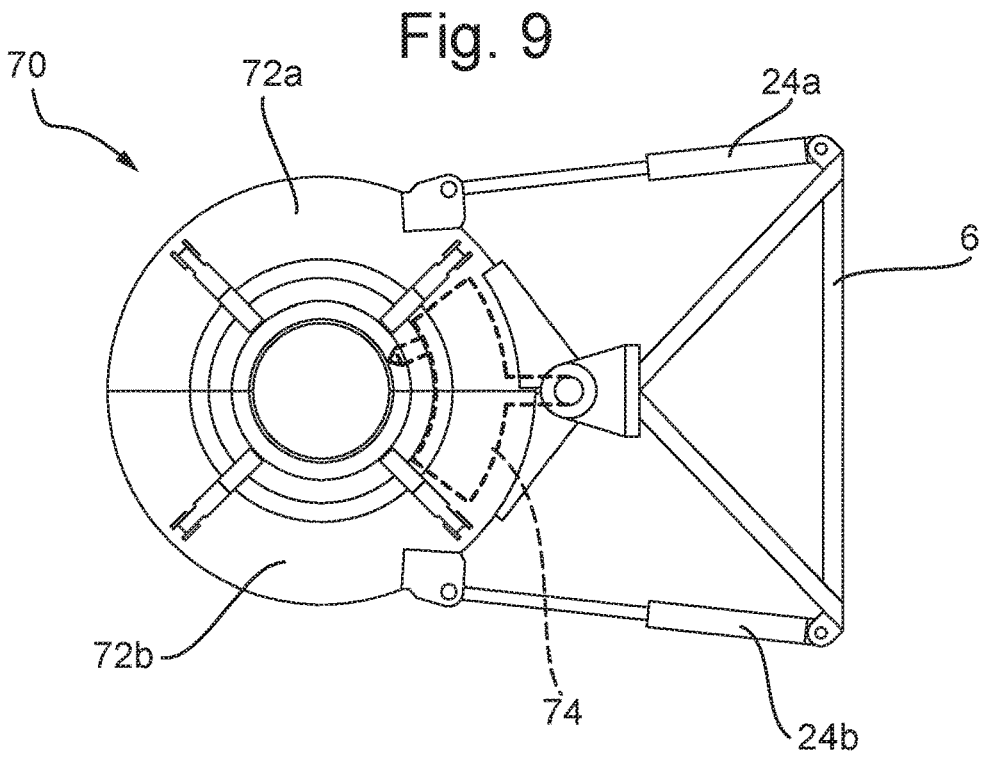
FIGS. 9 and 10 illustrate the operational module of FIG. 8 in an open position and in a closed position.
Figure 10:
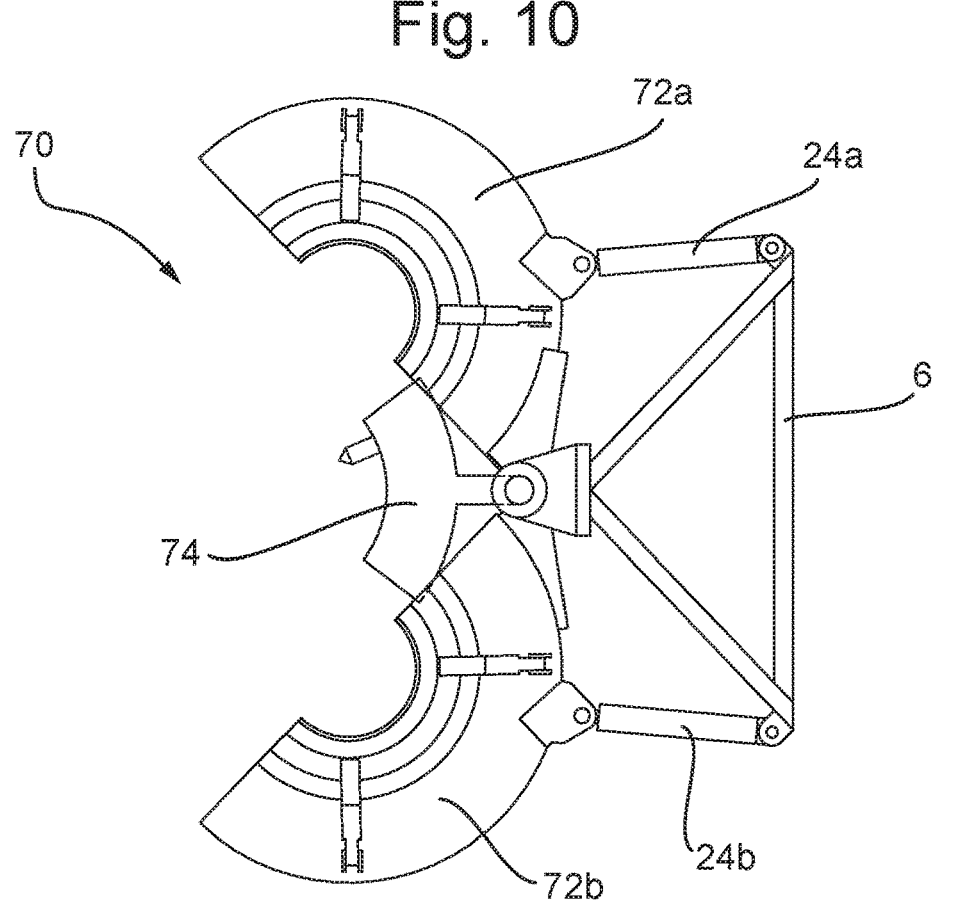

FIGS. 8 to 10 illustrate a third embodiment of an operational module 70. In this embodiment, the operational module comprises a housing 72 of similar construction to the housing 52 of the second operational module 50. However, the third embodiment of the operational module 70 does not include a positioning system within the housing 72. Instead, in this arrangement, the operational tool 74 is statically mounted with respect to the housing 52 and is rotated around the elongate body 100 by rotating the entire operational module 70.

The operational tool 74 operates in substantially the same manner as the operational tool 40 of the first embodiment. In some arrangements, the operational tool 74 may comprise a nozzle capable of a limited degree of movement. For example, although the nozzle may not be capable of rotating fully around the elongate body 100, the nozzle may be able to translate a short distance axially and circumferentially. Thus, the nozzle may be able to perform an additive manufacturing operation on a localised portion of the elongate body. For certain operations, this may be sufficient or this may be combined with rotation of the operational module 70, e.g. performing a localised operation in one region, then rotating the module 70 and performing another localised operation in another region.

In an embodiment, the operational tool 74 may be mounted to an axial guide rail within the housing 70. Thus, the operational tool 74 may be able to translate axially within the housing 72, but have only limited rotational capabilities.

The frame 6 for mounting the operational module 70 to the vehicle 1 is a fixed frame, as in the second embodiment. However, an actuatable frame similar to the frame 5 of the first embodiment may be used if desired.

Figure 11:
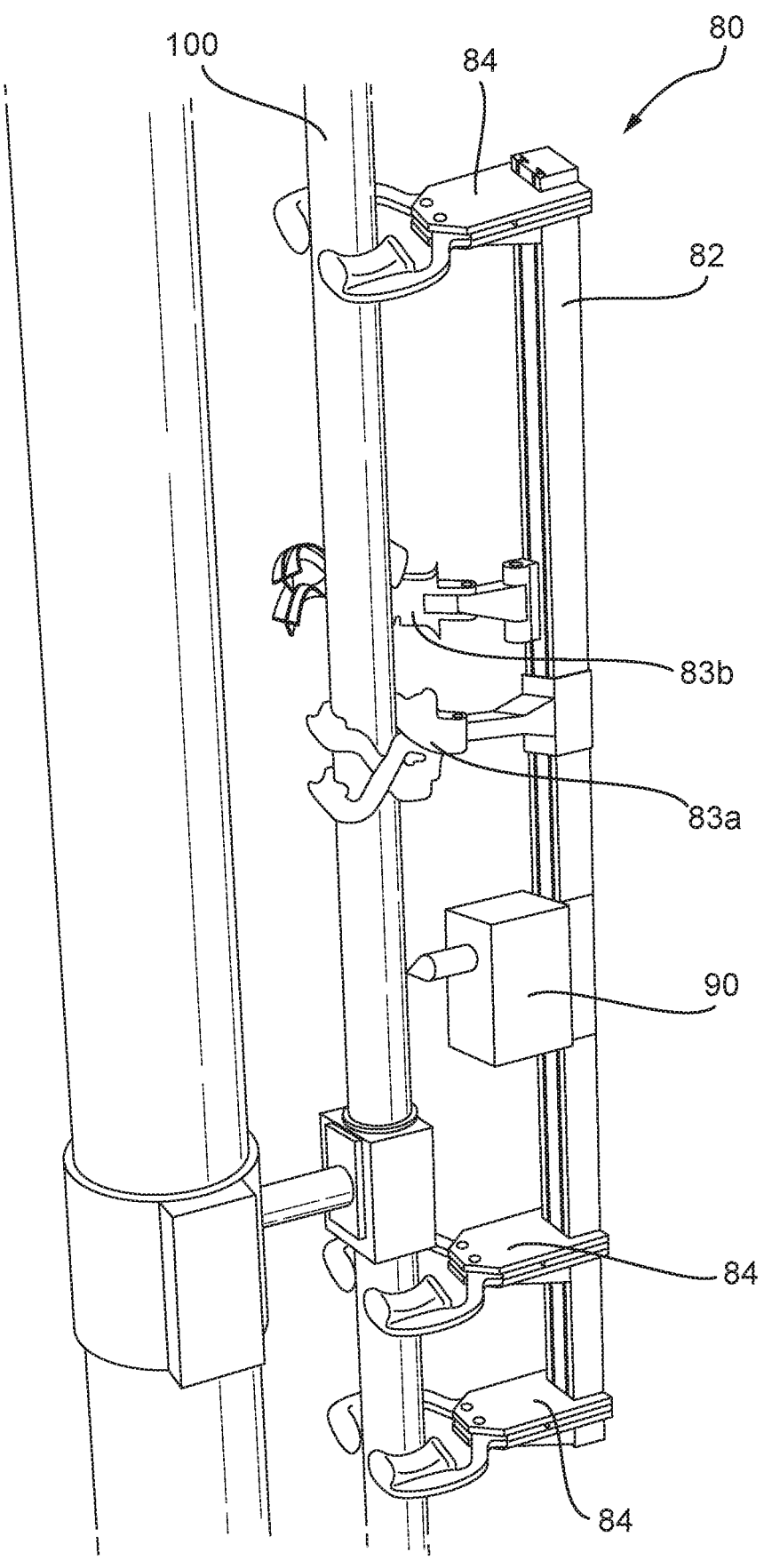
FIG. 11 illustrates an alternative subsea operations system.

FIG. 11 illustrates a fourth embodiment of an operational module 90 mounted to a vehicle 80. The vehicle 80 operates in substantially the same manner as the vehicle 1 of the first embodiment, and elements of the vehicle 80 of the fourth embodiment that correspond to elements of the vehicle 1 of the first embodiment are indicated with corresponding reference signs, but incremented by 80.

In this embodiment, an operational tool 90 is mounted directly to the vehicle 80 without any housing. The operational module operates in a similar manner to the operational tool 74 of the third embodiment. Furthermore, as in the third embodiment, the operational tool 74 may be capable of axial translation with respect to the vehicle 80. It will be appreciated that operational tools having positioning systems, such as in the first and second embodiments, could also be mounted directly to the vehicle 80 without a housing.

Although the described embodiments illustrate operational tools that use axial and circumferential/orbital movement around the elongate body 100, it will be appreciated that other positioning systems may be used. For example, the operational tool may be mounted to a robotic arm or other similar device capable of moving freely within the sealed chamber.

It will be appreciated that any suitable coordinate system may be used for controlling or defining the position of the operational tool. For example, the position of the operational tool may be controlled using x, a coordinates (referring to an axial position and an angular position), or using x, s coordinates (referring to an axial position and a circumferential distance around the elongate body). Where the distance of the tool from the elongate body is also controlled, the position may be defined using x, θ, r coordinates or x, s, r coordinates, i.e. additionally controlling a radial distance, r, from the elongate body. The distance may be defined as a distance from a specific point, e.g. from the surface of the elongate body or the axis of the elongate body, and may use any unit, e.g. a number of layer thicknesses. Furthermore, the position of the operational tool may of course be controlled or defined using x, y, z coordinates (3-dimensional Cartesian coordinates).

The operational tool may move in increment stages, for example using a stepper motor or the like, or may move continuously. The position of the operational tool may be determined analytically, e.g. by calculating a predicted position of the tool based on movement commands sent to the positioning tool, or may be measured using sensors, such as cameras or the like. Where the position of the tool is measured, the operational tool may use feedback to correct a position of the tool.

Whilst the illustrated operational modules are shown mounted to vehicles 1, 80 that translate axially along the elongate body 100, it will be appreciated that other vehicles may be used. For example, the operational modules could instead be mounted to a remotely-operated underwater vehicle (ROUV).

In further embodiments, the operational modules could be used in isolation, for example the operational module could be installed by a diver or a separate vehicle. The module could then perform the necessary operation before being removed. In such a situation, for example, the module could be mounted to a frame that attaches directly to the elongate body, but does not provide any transport function, or indeed the module may support its own weight once engaged with the elongate body.

Whilst the described system is intended for use with an elongate body, it will be appreciated that the system may be modified to perform additive manufacture operations on any shaped subsea body.

Furthermore, in a further embodiment, the operational module 10 may be used to manufacture components separately from the elongate body. Thus, the operational module could provide a subsea additive manufacture workshop for producing components in subsea conditions. For example, the module may be implemented as a static structure on the seafloor or immersed elsewhere in a liquid, for production of a part to be used/installed in its vicinity. For example, an ROV or similar which is fully independent from the workshop facilities could be used to install such components.

Whilst the described system is suited for use in subsea conditions, it will be appreciated that the described configuration may find applications in other, non-underwater environments.

For example, the described system may be particularly useful for performing operations in the splash zone, e.g. of an offshore platform. The term "splash zone" refers to the transition from air to water, i.e. where waves interact directly with the body. Typically bodies in the splash zone are exposed to significant dynamic loading. In such situations, the housing 10 can provide a controlled environment such that additive manufacture can still be performed. The housing 10 may also protect the repair from wave damage until it has fully set, dried, cured, etc.

In further examples, the described system may be employed for performing operations on non-underwater portions of a body that is at least partially underwater. Such bodies may include risers or similar elongate subsea bodies transitioning from underwater to topside, for example the portion of a riser in the splash zone or the portion of the riser between the splash zone and the platform floor. Further examples may include offshore towers, such as a spar-type structure, e.g. for an offshore wind turbine.

The system may in some embodiments even be used for structures that are substantially in non-underwater conditions. For example, the body may be one of a pipe, a tower, a chimney, scaffolding, a reservoir, a tank, a cooling tower, etc. These may be located topside, e.g. on an offshore platform, or elsewhere on land.

Whilst the housing 20 of the preferred embodiment has a generally cylindrical shape encircling the elongate body 100, the housing may have other configurations depending on the nature of the body. For example, the operation may be performed on a substantially flat portion of the body. For such situations, the housing may have a concave shell shape, such as a hemi-sphere, hemi-cylinder, etc., which may be configured to seal against the body and establish a sealed chamber around the portion of the body where the operation is to be performed.

This may be useful for performing operations on larger structures, such as a reservoir or other container. As above, such structures may be located subsea or in non-underwater situations.

Figure 12:
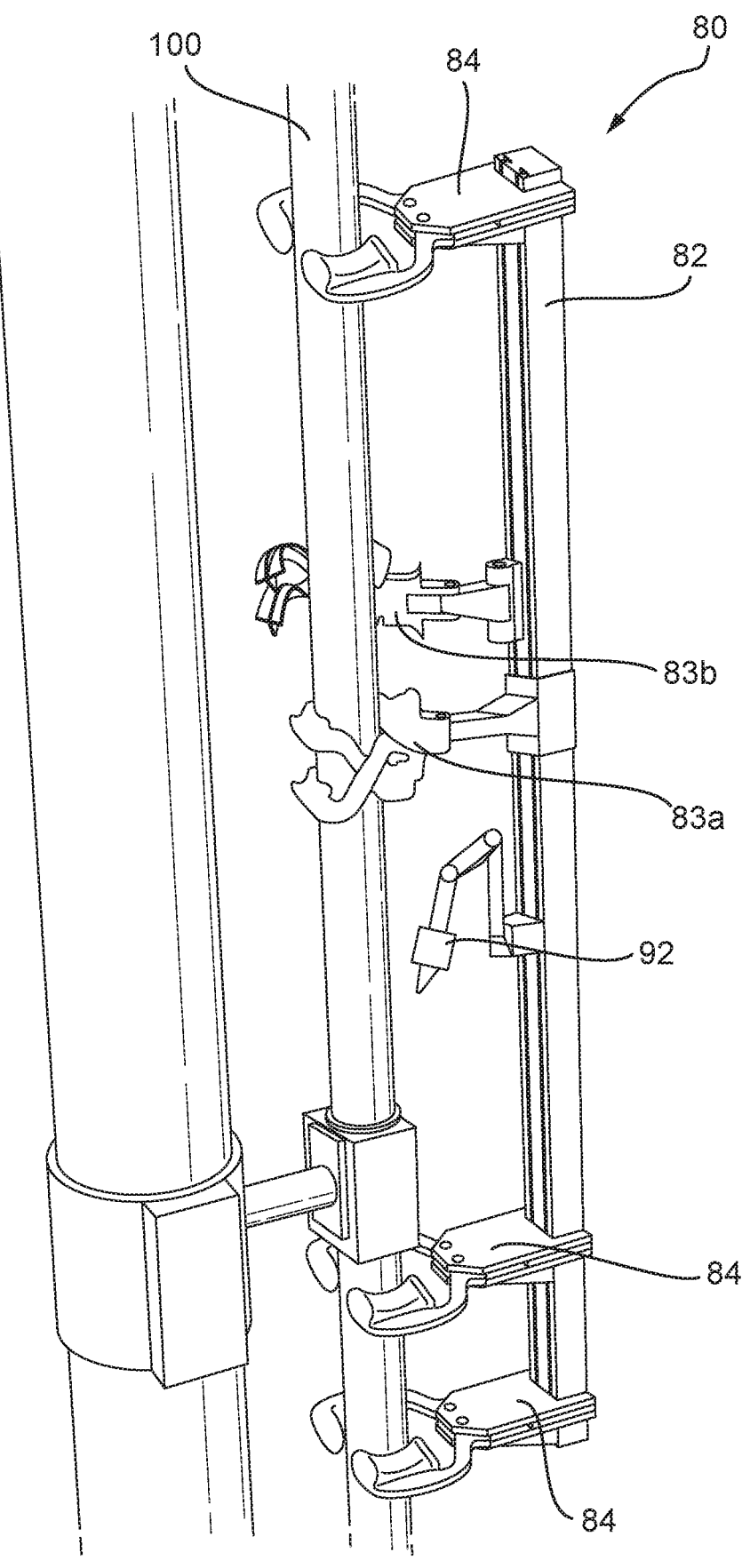
FIG. 12 illustrates a further alternative subsea operation system.

FIG. 12 illustrates a fifth embodiment comprising an operational tool 92 mounted to a vehicle 80. The vehicle 80 is substantially the same as in the fourth embodiment. However, in this embodiment, the operational tool comprises an additive manufacture tool mounted on a robotic arm.

The robotic arm is illustrated as being mounted at a fixed position on the carrier vehicle 80 without a housing. However, it will be appreciated that in alternative embodiments, the robotic arm may be mounted within a housing such as in the first two third embodiments, and/or the robotic arm may be mounted on a platform enabling translational motion, rotational motion, orbital motion or any other such motion.

The robotic arm enables adjustment of a relative angle of the additive manufacturing nozzle axis relative to the manufacturing surface. That may be of special interest with jetting or spraying additive manufacturing techniques.

Another solution to carry and control motion of an additive manufacturing tool can be found in WO 2012/013847. With reference to FIG. 3 of WO 2012/013847, a roller 24 is guided by the cranked wheel 31 around the pipe, while translational motion is ensured by moving the whole apparatus along the pipe. By substituting the roller with an additive manufacture tool, the earlier carrier solution of WO 2012/013847 could be employed for additive manufacture operations.

Figure 13:
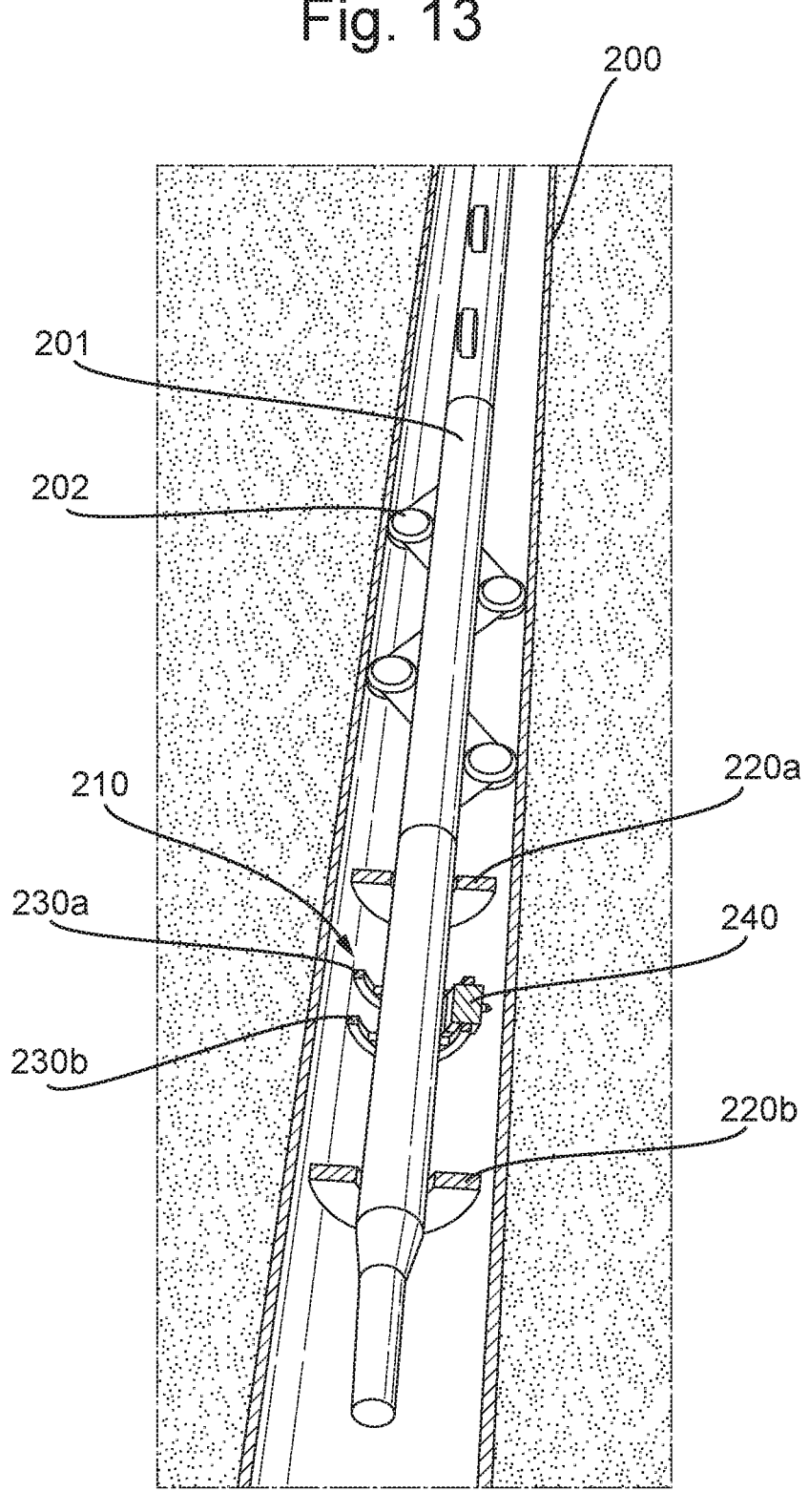
FIG. 13 illustrates operations system for performing operations inside a tubular body.

FIG. 13 shows an alternative embodiment of a vehicle 201 for performing an additive manufacture operation on an elongate, tubular body 200. In this embodiment, the vehicle 201 is capable of performing the additive manufacture operation on an internal surface of the body 200.

The vehicle 201 is formed having a generally elongate housing with wheels 202 mounted thereto. The wheels 202 are biased away from the housing so as to engage with the interior walls of the body 202. The wheels are oriented in at least two, non-parallel planes such that the housing is maintained in the centre of the tubular body 200.

The vehicle 201 carries an operational module 210 configured to perform an additive manufacturing operation on the internal surface of the body 200. It should be noted that the illustrated vehicle 201 is merely exemplary, and any suitable means of propelling the operational module 210 may be used. Such vehicles are well known in the pipeline industry, and are currently used for inspection or maintenance (e.g. pigging) purposes.

The operational module 210 comprises two seals 220. The seals 220 may be collapsible so as not to engage the walls of the tubular body 200 during transport. When deployed, the seals engage the interior walls of the tubular body 200 and the outer surface of the housing of the vehicle 201. This creates a sealed chamber between the two seals 220.

Located between the two seals 220 is an operational module 240. The operational module 240 is mounted to the vehicle 201 by a positioning system 230. The positioning system comprises two circular guide rails 230 mounted to the vehicle 201 and the operational module 240 is configured to move in an orbital path along these guide rails 230. Whilst two guide rails are illustrated, it will be appreciated that one may be used in some embodiments.

Furthermore, the circular guide rails 230 are mounted to axially-oriented guide rails (not shown) mounded on the vehicle 201, such that the circular guide rails 230 can move axially along the vehicle 201.

The illustrated positioning system 230 operates in substantially the same manner as the positioning system 54 illustrated in FIG. 5, except that it is positioned within the tubular body 200 instead of around the tubular body 100, and the operational module 240 is oriented outwards instead of inwards.

When performing an additive manufacture operation, the vehicle 201 operates in substantially the same manner as the vehicle 1 of the first embodiment. In particular, after establishing the sealed chamber, the sealed chamber is evacuated and filled with an inert gas. Optionally, water or another liquid may be filled into the sealed chamber before filling it with inert gas to force out any remaining hydrocarbon gas as this could present a risk of explosion.

After filling the sealed chamber with the inert gas, the positioning system 230 is controlled to move the operational tool 240 along a trajectory that deposits material in the desired shape.

Whilst not illustrated, the vehicle 201 is preferably provided with inspection tools for performing inspection of the surface before beginning the operation to map the trajectory to the actual surface of the tubular body 200. The inspection tools may also be used to inspect the repair or new structure after completion of the additive manufacture process.

Whilst again not illustrated, the vehicle 201 may also comprise cleaning tools for cleaning the surface prior to performing the additive manufacture process. The cleaning tools may remove corrosion or existing surface finishes to ensure that the additive manufacturing process can adhere new material to the existing structure. The system may also comprise tools for smoothing or roughening the surface as required in preparation for the additive manufacture operation.

Whilst not illustrated, the vehicle 201 may also comprise a finishing module. The finishing module may be carried by the carrier. The finishing module is preferably capable of performing finishing of the interior surface after performing the additive manufacturing operation, such as cleaning or polishing. The finishing may comprise abrasive cleaning and/or chemical cleaning. Exemplary finishing techniques may include one or more of washing, etching, brushing, grinding, polishing (liquid) blasting, (solid) abrasive blasting and coating. The coating may be performed by brushing and/or spraying. The coating may be polymeric coating, hard coating, such as of the epoxy type, or a soft coating, such as of the synthetic rubber type.

Whilst the preferred embodiment includes seals 220 mounted to the vehicle 201, it will be appreciated that these are optional. For example, separate seals may be provided above and/or below the vehicle 201 or in some embodiments the entire tubular body may be sealed at its ends to control the environment therein. In yet further embodiments, sealing may not be used at one or both ends. For example, after draining any liquid or before it has been filled, the tubular body may simply contain air and/or be open to atmosphere.

FIGS. 14A to 14D illustrate an exemplary process by which a repair operation may be performed on a pin hole fault using additive manufacture techniques.

A pin hole fault in a pipe wall is illustrated in FIG. 14A. Upon detection and location of a pin hole in the pipe wall the system will establish a sealed chamber around the pin hole (which may require both external and internal sealing in the case of a subsea piping). This sealed chamber will permit stable control of the environment.

Next, the pin hole is machined to a larger cone as illustrated in FIG. 14B.

Once the pin hole has been machined to a larger cone, it is then repaired using additive manufacture. For example, as shown in FIG. 14C, the conical hole may be filled by a cold spray additive manufacture process. Whilst not shown, the cold spray surface may optionally be polished and/or coated as appropriate.

Optionally, as shown in FIG. 14D, a background locking plate may be installed (screwed, riveted, or preferably welded) on the opposite side of the pipe wall. This background plate may frame and limit the extension of the cold spray.

In the above example, it will be appreciated that sealing both inside and outside of the pipe wall may be required. This may be performed by the respective internal and external repair systems illustrated in the earlier Figures. Optionally, the repair may be performed by one of the systems, or each system may perform part of the repair, i.e. the fault may be repaired both from within the pipeline and from outside of the pipeline.

The invention claimed is:

1. A system for repairing a subsea pipe using additive manufacturing, the system comprising:

a housing configured to establish a sealed chamber around a section of the subsea pipe such that the sealed chamber has a controllable environment, the housing defining an inlet and an outlet to the sealed chamber;

an environmental system including a controllable valve on the inlet such that the sealed chamber is filled with a fluid from a source of fluid through the controllable valve and the inlet, wherein the environmental system monitors and controls a fluid within the sealed chamber;

a directed energy deposition applicator mounted within the housing such that the directed energy deposition applicator performs a directed energy deposition operation on the subsea pipe within the sealed chamber after filling the sealed chamber with the fluid;

a guide rail configured to permit linear translation of the directed energy deposition applicator with respect to the subsea pipe; and a vehicle configured to translate along the subsea pipe to position the housing at a desired location on the subsea pipe.

2. The system of claim 1, wherein the environmental system is configured to drain water from the sealed chamber.

3. The system of claim 1, wherein the environmental system is configured to regulate at least one of a group consisting of a temperature and a pressure within the sealed chamber.

4. The system of claim 1, further comprising a positioning system for positioning the directed energy deposition applicator with respect to the subsea pipe, the positioning system comprising the guide rail.

5. The system of claim 4, wherein the positioning system is further configured to permit an orbital motion of the directed energy deposition applicator around the subsea pipe.

6. The system of claim 1, wherein the directed energy deposition operation comprises depositing a plurality of layers of a material onto the subsea pipe.

7. The system of claim 1, wherein the directed energy deposition operation comprises a repair operation.

8. The system of claim 1, wherein the subsea pipe is an elongate body.

9. The system of claim 1, wherein the additive manufacture operation is a cold spray additive manufacture operation.

* * * * *